US012039078B2

(12) United States Patent
Madhavapeddi et al.

(10) Patent No.: US 12,039,078 B2
(45) Date of Patent: Jul. 16, 2024

(54) CRYPTOGRAPHICALLY SECURE DATA PROTECTION

(71) Applicant: Google LLC, Mountain View, CA (US)

(72) Inventors: Shreedhar Madhavapeddi, Seattle, WA (US); Sergei Akulich, Seattle, WA (US); Stephen W. Rupp, Brooklyn, NY (US); Gang Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 233 days.

(21) Appl. No.: 17/617,358

(22) PCT Filed: Oct. 27, 2020

(86) PCT No.: PCT/US2020/057546
§ 371 (c)(1),
(2) Date: Dec. 8, 2021

(87) PCT Pub. No.: WO2022/093199
PCT Pub. Date: May 5, 2022

(65) Prior Publication Data
US 2022/0300643 A1 Sep. 22, 2022

(51) Int. Cl.
G06F 21/62 (2013.01)
G06F 21/60 (2013.01)
(Continued)

(52) U.S. Cl.
CPC ........ G06F 21/6245 (2013.01); G06F 21/604 (2013.01); H04L 63/0428 (2013.01); *H04L 67/53* (2022.05)

(58) Field of Classification Search
CPC ....... G06F 21/6263; G06F 21/10; H04L 9/30; H04L 9/3213
See application file for complete search history.

(56) References Cited

U.S. PATENT DOCUMENTS 7,444,519 B2 * 10/2008 Laferriere ............... G06F 21/33
726/8
7,478,434 B1 1/2009 Hinton et al.
(Continued)

FOREIGN PATENT DOCUMENTS

JP 2006-048653 2/2006
JP 2008-525863 7/2008
(Continued)

OTHER PUBLICATIONS

C. Esposito and M. Ciampi, "On Security in Publish/Subscribe Services: A Survey," in IEEE Communications Surveys & Tutorials, vol. 17, No. 2, pp. 966-997, Secondquarter 2015. (Year: 2015).*

(Continued)

*Primary Examiner* — Kari L Schmidt
(74) *Attorney, Agent, or Firm* — Fish & Richardson P.C.

(57) ABSTRACT

This disclosure relates to data security and cryptography. In one aspect, a method includes receiving a request for a subscription token for a given user by a data security system from a publisher computing system of a publisher. The request includes user identification information provided to the publisher by the given user when subscribing to electronic content of the publisher. The data security system generates the subscription token which includes a set of data that includes a first encrypted user identifier generated by encrypting a first user identifier for the given user using an encryption key of the data security system, and, for each of one or more content platforms, an attachment element that includes a second encrypted user identifier generated by encrypting a second user identifier for the given user using an encryption key of the content platform and transmitting the subscription token to the publisher computing system.

20 Claims, 11 Drawing Sheets

(51) Int. Cl.
  *H04L 9/40*  (2022.01)
  *H04L 67/53*  (2022.01)

(56) References Cited

U.S. PATENT DOCUMENTS

| | | | | |
|---|---|---|---|---|
| 11,233,772 | B1* | 1/2022 | Dinan | G06F 21/6245 |
| 11,652,813 | B2* | 5/2023 | Patel | H04L 9/3213 |
| | | | | 726/28 |
| 11,902,289 | B2* | 2/2024 | Dunjic | H04L 9/3247 |
| 2005/0223412 | A1* | 10/2005 | Nadalin | G06F 21/6209 |
| | | | | 726/3 |
| 2006/0002556 | A1 | 1/2006 | Paul | |
| 2007/0043945 | A1* | 2/2007 | Choi | H04L 9/0866 |
| | | | | 713/168 |
| 2007/0073817 | A1* | 3/2007 | Gorty | G06F 21/335 |
| | | | | 709/225 |
| 2007/0186277 | A1* | 8/2007 | Loesch | G06F 21/34 |
| | | | | 713/182 |
| 2008/0083024 | A1* | 4/2008 | Glazer | G06F 21/6245 |
| | | | | 726/8 |
| 2008/0240447 | A1* | 10/2008 | Zhu | H04L 9/3271 |
| | | | | 380/30 |
| 2011/0145907 | A1* | 6/2011 | Chua | H04L 9/3213 |
| | | | | 726/7 |
| 2011/0161474 | A1* | 6/2011 | Gannon | G06Q 30/02 |
| | | | | 709/221 |
| 2012/0036360 | A1* | 2/2012 | Bassu | H04L 9/3228 |
| | | | | 713/168 |
| 2012/0102329 | A1* | 4/2012 | Mittal | H04L 63/06 |
| | | | | 713/176 |
| 2012/0109882 | A1* | 5/2012 | Bouse | H04L 67/306 |
| | | | | 707/E17.107 |
| 2012/0151077 | A1* | 6/2012 | Finster | G06Q 50/10 |
| | | | | 726/9 |
| 2013/0036304 | A1 | 2/2013 | Lin et al. | |
| 2014/0067940 | A1* | 3/2014 | Li | H04L 51/52 |
| | | | | 709/204 |
| 2014/0086397 | A1* | 3/2014 | Febonio | H04M 3/38 |
| | | | | 379/93.02 |
| 2014/0282962 | A1* | 9/2014 | Harrison | G06F 21/34 |
| | | | | 726/7 |
| 2015/0074259 | A1 | 3/2015 | Ansari et al. | |
| 2015/0106881 | A1 | 4/2015 | Wharton et al. | |
| 2015/0112864 | A1* | 4/2015 | Wallaja | G06Q 20/02 |
| | | | | 705/44 |
| 2015/0304110 | A1* | 10/2015 | Oberheide | H04L 9/3215 |
| | | | | 713/155 |
| 2016/0164680 | A1* | 6/2016 | Liao | H04L 9/3213 |
| | | | | 713/155 |
| 2016/0277261 | A9 | 9/2016 | Ansari et al. | |
| 2017/0063840 | A1* | 3/2017 | Krishnaiah | H04L 63/0861 |
| 2017/0076277 | A1* | 3/2017 | Zhou | G06Q 30/02 |
| 2018/0060989 | A1* | 3/2018 | Hietanen | G06K 7/10722 |
| 2019/0199530 | A1 | 6/2019 | Reitsma et al. | |
| 2020/0067903 | A1 | 2/2020 | Yegorin | |
| 2020/0160388 | A1 | 5/2020 | Sabeg et al. | |
| 2021/0344484 | A1* | 11/2021 | Pasquali | H04L 65/611 |
| 2021/0350021 | A1* | 11/2021 | Wang | H04L 9/30 |
| 2022/0385738 | A1* | 12/2022 | Circosta | H04L 63/101 |

FOREIGN PATENT DOCUMENTS

| | | |
|---|---|---|
| JP | 2012-137995 | 7/2012 |
| JP | 2020-068388 | 4/2020 |
| WO | WO 2006041462 | 4/2006 |

OTHER PUBLICATIONS

Onica, Emanuel, et al. "Efficient key updates through subscription re-encryption for privacy-preserving publish/subscribe." Proceedings of the 16th Annual Middleware Conference. 2015, pp. 25-36. (Year: 2015).*

International Search Report and Written Opinion in International Appln. No. PCT/US2020/057554, dated Jun. 23, 2021, 13 pages.

Marco Scaceres, "Trust-Token-API" submitted on Oct. 3, 2019, <https://github.com/WICG/trust-token-api>, 13 pages.

Wikipedia.org [online], "HTTP cookie" Jul. 24, 2020, retrieved on Jul. 29, 2020, retrieved from URL <https://en.wikipedia.org/wiki/HTTP_cookie#Http-only_cookie>, 26 pages.

International Preliminary Report on Patentability in International Appln. No. PCT/US2020/057546, mailed on May 11, 2023, 9 pages.

International Preliminary Report on Patentability in International Appln. No. PCT/US2020/057554, mailed on May 11, 2023, 8 pages.

International Search Report and Written Opinion in International Appln No. PCT/US2020/057546, Jun. 23, 2021, 14 pages.

Office Action in Indian Appln. No. 202127056847, mailed on Oct. 6, 2023, 7 pages (with English translation).

Office Action in Chinese Appln. No. 202080046324.2, mailed on Dec. 26, 2023, 12 pages (with English translation).

Notice of Allowance in Japanese Appln. No. 2022-548001, mailed on Oct. 2, 2023, 5 pages (with English translation).

* cited by examiner

CRYPTOGRAPHICALLY SECURE DATA PROTECTION

CROSS-REFERENCE TO RELATED APPLICATIONS

This application is a National Stage Application under 35 U.S.C. § 371 and claims the benefit of International Application No. PCT/US2020/057546, filed Oct. 27, 2020. The disclosure of the foregoing application is incorporated herein by reference in its entirety.

TECHNICAL FIELD

This specification relates to data security and cryptography.

BACKGROUND

Client devices transmit requests and other data over public networks, such as the Internet. These communications can be altered by other parties, such as parties that intercept the communications and/or intermediaries that receive the communications and forward them to other parties. Client devices are also subject to malicious attacks, such as viruses and malware that can send fraudulent requests without the user's knowledge or authorization. In addition, other parties can emulate a client device to send requests that appear to originate from the client device, but actually come from a device of the other parties.

A user of a client device can use an application (e.g., a web browser or a native application) to obtain content from various content providers (e.g., search engines, social media platforms, website publishers, etc.). The communications between the client devices and the content providers' servers can include sharing of sensitive information (e.g., users' personally identifiable information (PII)), such as name, email address, phone numbers, in exchange for digital content. For example, subscription-based content delivery can use PII to deliver content to users.

SUMMARY

This specification describes technologies relating to protecting user privacy. In general, one innovative aspect of the subject matter described in this specification can be embodied in methods that include receiving a request for a subscription token for a given user by a data security system and from a publisher computing system of a publisher. The request includes user identification information provided to the publisher by the given user when subscribing to electronic content of the publisher. In response to receiving the request for a subscription token, the data security system generates the subscription token for the publisher and the given user. The subscription token includes (i) a set of data that includes a first encrypted user identifier generated by encrypting a first user identifier for the given user that is used by the data security system to identify the given user using an encryption key of the data security system, and, for each of one or more content platforms, (ii) an attachment element that includes a second encrypted user identifier generated by encrypting a second user identifier for the given user that is used by the content platform to identify the given user using an encryption key of the content platform and transmitting the subscription token to the publisher computing system. Other implementations of this aspect include corresponding apparatus, systems, and computer programs, configured to perform the aspects of the methods, encoded on computer storage devices.

These and other implementations can each optionally include one or more of the following features. In some aspects, the data security system includes a computing system of an e-mail provider and the user identification information includes an e-mail address of the given user and for an e-mail account of the given user with the e-mail provider.

In some aspects, the first user identifier for the given user includes one of (i) the e-mail address of the given user for the e-mail account of the given user with the e-mail provider or (ii) another user identifier corresponding to the e-mail address of the given user. In some aspects, the user identification information comprises a phone number of the given user.

In some aspects, the attachment element for each content platform includes a digital signature of the set of data and the second encrypted user identifier of the attachment element generated using a private key of the data security system. In some aspects, the subscription token comprises a digital signature of the set of data and each attachment element.

In some aspects, the publisher computing system receives recurring renewal requests that are each for a renewed subscription token for the given user that includes a respective first encrypted user identifier of a previous request. In some aspects, for each renewal request, an updated first encrypted user identifier is generated that is different from the first encrypted user identifier of the previous request. In some aspects, the renewed subscription token includes an updated set of data that includes the updated first encrypted user identifier and each attachment element. Each renewed subscription token is transmitted to the publisher computing system.

In some aspects, the renewed subscription token further includes an updated data privacy settings that have been updated by the user since the subscription token was generated. In some aspects, generating the subscription token for the publisher and the given user includes identifying the one or more content platforms such that each content platform is designated as being an eligible content platform by the publisher and the user and each eligible content platform being a content platform is eligible to select digital components for presentation to the given user with electronic resources of the publisher.

In some aspects, generating the subscription token for the publisher and the given user includes identifying the one or more content platforms such that each content platform designated as being an eligible content platform by the publisher and the user and each eligible content platform being a content platform is eligible to collect, store, and use data of the given user.

In some aspects, a client device of the given user is provided an interactive user interface that enables the given user to manage use of data of the given user by a set of publishers and a set of content platforms. In some aspects, the interactive user interface includes data identifying content platforms that partner with the publisher to select digital components for presentation with content of the publisher and enables the given user to select the one or more content platforms that are eligible to obtain and store data of the given user. The interactive user interface further enables the user to select the one or more publishers that are eligible to obtain and store data for the given user and also select one or more ways in which the data of the given user is eligible to be used by each content platform and each publisher. The interactive user interface further enables the user to request that the one or more content platforms or the one or more publishers to delete the data for the given user.

In some aspects, the data security system detects that the given user has designated the publisher as being ineligible to obtain and store data for the given user based on data received from the client device of the given user. In some aspects, after detection, the data security system receives a request for a renewed subscription token for the given user from the publisher computing system. The data security system determines to not provide the renewed subscription token for the given user to the publisher computing system in response to detecting that the given user has designated the publisher as being ineligible to obtain and store data of the user.

In some aspects, the data security system detects that the given user has designated the publisher as being ineligible to obtain and store data for the given user based on data received from the client device of the given user. In some aspects, after detection, the data security system receives a request for a renewed subscription token for the given user from the publisher computing system. The data security system determines to not include an attachment element for the given content platform with the renewed subscription token in response to detecting that the given user has designated a given content platform as being ineligible to obtain and store data for the given user.

In general, another aspect of the subject matter described in this specification can be embodied in methods that include the actions of updating a user interface to present user interface controls that enable a user to specify data privacy settings that define how entities use data of the user. A request to modify a data privacy setting for one or more entities is received from the client device based on user interaction with one or more of the user interface controls that includes an ephemeral user identifier for the user and an attestation token, wherein the ephemeral user identifier is based on a phone number of the client device. The request is validated using at least the ephemeral user identifier for the user and the attestation token and in response to validating the request, data instructing the entity to modify usage of the user data based on the modified given data privacy setting is transmitted to each of the one or more entities. Other implementations of this aspect include corresponding apparatus, systems, and computer programs, configured to perform the aspects of the methods, encoded on computer storage devices.

These and other implementations can each optionally include one or more of the following features. In some aspects, prior to updating the user interface, a token request that requests a subscription token for the phone number of the user is received from a publisher and a message including (i) a resource locator for an electronic resource comprising the user interface and (ii) the ephemeral user identifier for the user is transmitted, to the client device.

In some aspects, the ephemeral user identifier includes an encrypted result generated by encrypting the phone number or the e-mail address of the user. In some aspects, the request further includes a public key of the client device and validating the request further includes verifying an association between the ephemeral user identifier and the public key of the client device.

In some aspects, verifying the ephemeral user identifier comprises attempting to decrypt the ephemeral user identifier and determining that the ephemeral user identifier is verified successfully when the ephemeral user identifier is decrypted successfully.

In some aspects, the attestation token and the updated settings is stored in an audit log.

In some aspects, the request includes a web cookie. In some aspects, validating the request includes decrypting the ephemeral user identifier and verifying the web cookie using the ephemeral user identifier.

In some aspects, the attestation token includes a set of data and a digital signature of the set of data. In some aspects, verifying the attestation token comprises determining, based on the set of data, that the digital signature is valid.

In some aspects, the attestation token includes a token creation timestamp indicating a time at which the attestation token was created and verifying the attestation token includes determining that the time at which the attestation was created is within a threshold duration of a time at which the request was received.

In some aspects, the attestation token includes an integrity token comprising a verdict of trustworthiness of the client device or an application running on the client device and verifying the attestation token includes verifying the integrity token.

The subject matter described in this specification can be implemented in particular embodiments so as to realize one or more of the following advantages. Providing a user with a platform for managing data privacy settings across the online ecosystem provides the user with a transparent view of which online entities have access to the user's data, which may include sensitive information, and enables the user to control which entities can store the user's data and how the entities use the user's data. This transparent and efficient control over privacy settings allows the user to decide which online entities have access to user data, which online entities do not have access to user data, and how each entity stores and uses the data. Compared to existing techniques, the methods described in this document further prevents sharing of sensitive user information to third party entities thereby maintaining user privacy.

The techniques can include storing information, such as user privacy settings and user actions of modifying privacy settings, for the purpose of auditing online entities that have access to user data to verify compliance to data distribution and user privacy protocols and to identify any rouge entity that might be misusing user data. The techniques include using a subscription token with one or more attachment elements that are respectively for one or more recipients and each attachment element can include data, e.g., encrypted data, for its recipient. By including attachment elements as separate data structures with the subscription token rather than including the data for each entity within the subscription token, the attachment elements can be removed from the overall message or other electronic communication without affecting the ability of the recipients to verify the subscription token. This enables one of the recipients to receive the subscription token and all of the attachment elements and forward, for each other recipient only the attachment element for that recipient with the subscription token.

In addition, this reduces the processing power and computational resources (e.g., CPU cycles) required to verify the attestation tokens. For example, if the data for each recipient was included in the attestation token, the recipient's device would be required to scan all of this data in addition to the other data of the attestation token to verify the digital signature of the attestation token. By generating an attachment element for each recipient, the device of each recipient only has to scan the other attestation data to verify the signature, e.g., without scanning data for each recipient. In addition, this better secures the data of each recipient by not providing the recipient's data to other recipients. Even if the data is encrypted in the attestation token, the encrypted data would be vulnerable to another entity that finds a way to decrypt the data.

In some implementations, the data size of the subscription token can be reduced by including a single digital signature over the entire subscription token including all of the attachment elements rather than a respective digital signature for each attachment element. This can reduce data storage requirements for the subscription tokens and reduce bandwidth consumption when transmitting the subscription tokens from client devices. Aggregated over thousands or millions of transmissions per day, this can result in substantial data storage and bandwidth savings.

E-mail providers can act as central authorities that provide the mechanisms, e.g., platform and/or user interfaces that enable the users to manage how their data is used by various online entities. In this way, users can more easily manage how their data is used in one central location by way of an entity that the users already trust to store potentially sensitive data of the users.

The e-mail providers or other central authorities can issue subscription tokens to publishers that work with content platforms that use data of users to select content, e.g., digital components, for the users based on such data. These tokens include cryptographic and privacy preserving features that prevent other entities from tracking the users, enables the content platforms to prove that they are using user data in accordance with their consent settings, and prevents falsification of such data. Users can easily manage which entities can receive and/or use their data by interacting with user interfaces provided by the central authority (e.g., e-mail provider) and, if an entity is blocked, the central authority can prevent the entity from being able to receive the subscription tokens and/or to correlate the tokens with users (e.g., by not providing attachment elements that include the entity's user identifier for the user with the token).

Historically, third party cookies (i.e., cookies from a different domain than the resource being rendered by a client device) have been used to collect data from client devices across the Internet. However, some browsers are blocking the use of third party cookies, thereby preventing the collection of data using third party cookies. This creates a problem when attempting to utilize collected data to enhance online browsing experiences. In other words, without the use of third party cookies, much of the data previously collected is no longer available, which prevents computing systems from being able to use that data. The subscription tokens described in this document enable similar functionality, but in a way that is transparent to users and enables the users to have fine grained control over how their data is collected and used.

Recipients of subscription tokens can reduce data storage requirements by removing attachment elements for other recipients. Data storage requirements can be further reduced by storing a single token for multiple events when the token provides user consent for using user data for the multiple events. Instead, an audit log can include, for each event, an identifier or reference to the corresponding subscription token. By issuing subscription tokens per particular time period rather than per request or other communication that includes a subscription token, the amount of computational resources needed to generate the tokens is reduced, the amount of bandwidth consumed distributing the subscription tokens to publishers is reduced, and the data storage requirements for storing the subscription tokens by recipients is reduced.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques that enable users to manage data privacy settings across the online ecosystem from a central platform and in a secure and cryptographically provable manner. The techniques enable each user to control (e.g., allow and/or revoke) permissions to online entities, such as content platforms, that define whether data of the user can be collected and/or stored and, if so, how that data is used and for which duration.

One or more data security systems can each act as a central platform that manages the data privacy of users (e.g., manage which entities can collect, store, and use data of the users) using subscription tokens. In some implementations, the data security systems can be operated by e-mail providers and each e-mail provider can manage the data privacy of users that have an e-mail account with the e-mail provider. A default data security system can manage the data privacy of users that do have an e-mail account with a participating e-mail provider.

Figure 1:
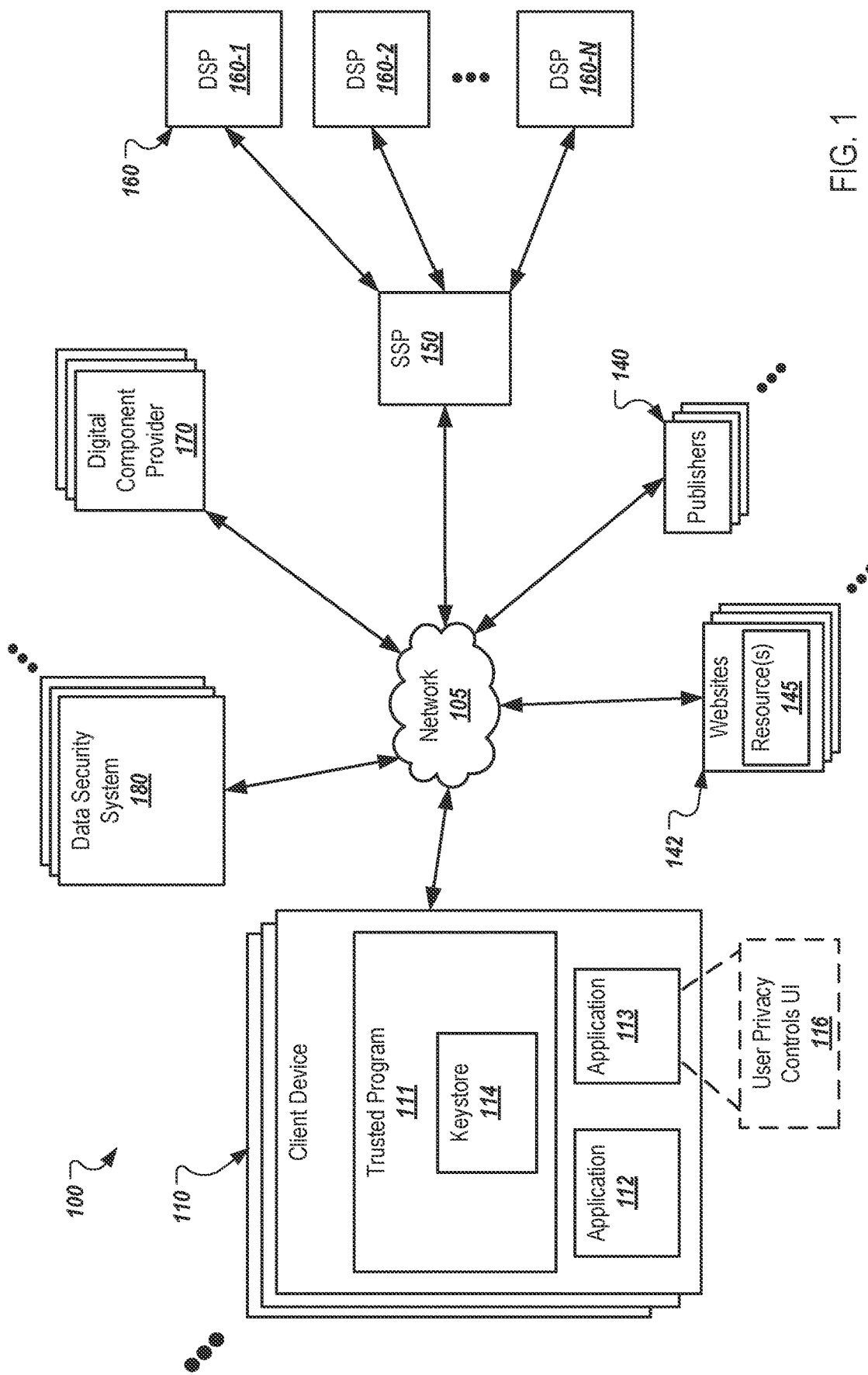
FIG. 1 is a block diagram of an environment in which data security systems manage the security and privacy of user data.

FIG. 1 is a block diagram of an environment 100 in which data security systems 180 manage the security and privacy of user data. The example environment 100 includes a data communication network 105, such as a local area network (LAN), a wide area network (WAN), the Internet, a mobile network, or a combination thereof. The network 105 connects client devices 110, digital component providers 170, demand-side platforms (DSPs) 160, supply-side platforms (SSPs) 150, data security systems 180, publishers 140, and websites 142. The example environment 100 may include many different client devices 110, digital component providers 170, DSPs 160, SSPs 150, data security systems 180, publishers 140, and websites 142.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

A client device 110 can further include a trusted program 111. The trusted program 111 can include trusted code from a reliable source that is difficult to falsify. For example, the trusted program 111 can be an operating system, a portion of an operating system, a web browser, etc. In some implementations, the trusted program 111 can also include a secure storage (e.g., keystore 114) for the client device 110 that is accessible only by the trusted program 111 on the client device 110.

Some resources, application pages, or other application content can include digital component slots for presenting digital components with the resources 145 or application pages. A digital component slot can be a digital component tag embedded in the resource that includes computer-readable code for requesting a digital component. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component for presentation to a user of the client device 110.

Some publishers 140 use an SSP 150 to manage the process of obtaining digital components for digital component slots of its resources 145 and/or applications. An SSP 150 is a technology platform implemented in hardware and/or software that automates the process of obtaining digital components for the resources and/or applications. An SSP 150 can interact with one or more DSPs 160 to obtain information that can be used to select a digital component for a digital component slot. Each publisher 140 can have a corresponding SSP 150 or multiple SSPs 150. Multiple publishers 140 may use the same SSP 150.

Digital component providers 170 can create (or otherwise publish) digital components that are presented in digital component slots of publisher's resources and applications. The digital component providers 170 can use a DSP 160 to manage the provisioning of its digital components for presentation in digital component slots. A DSP 160 is a technology platform implemented in hardware and/or software that automates the process of distributing digital components for presentation with the resources and/or applications. A DSP 160 can interact with multiple SSPs 150 on behalf of digital component providers 170 to provide digital components for presentation with the resources and/or applications of multiple different publishers 140. In general, a DSP 160 can receive requests for digital components (e.g., from an SSP 150 directly or by way of an exchange), generate (or select) a selection parameter for one or more digital components created by one or more digital component providers based on the request, and provide data related to the digital component (e.g., the digital component itself) and the selection parameter to an SSP 150.

In some cases, it is beneficial to a user to receive digital components according to the interests of the user. Some publishers 140 require users to subscribe to their websites 142 or provide subscription information to download a native application of the publisher 140. In other cases, a publisher 140 can provide additional services or features to subscribers that are not provided to non-subscribers. To subscribe, users' generally provide PII such as an e-mail address or phone number to the publishers 140, e.g., via the website 142 of the publisher 140 or an application 112.

Conventionally, code of a digital component slot of a publisher's resource 145 may send a third party cookie with a request for digital components. For example, assume that a user navigates to a website that is published by the publisher 140 that provides news articles along with other digital components from one or more DSPs 160-1 . . . 160-N. To receive news articles, the user subscribes to the website using the user's email address. In order to provide custom digital components to the user, the code can provide the third-party cookie (which may be associated with user-related data, such as browsing history) to the SSPs 150, which can in turn provide the third-party cookie to DSPs 160. Since not all parties having access to the user data are verified and/or trusted, this user data can be used for malicious activity by an unverified and/or untrusted party and the user has little or no visibility as to what entities receive the data or how such data is used. Instead, the user may have to delete various cookies from the client device 110 or block recipients on a one-by-one basis, e.g., at their websites.

To protect user privacy and manage the security of user data, the environment 100 includes one or more data security systems 180 that enable the users to manage which entities receive their data, which entities are allowed to store their data, how those entities are allowed to use their data and/or for what duration of time the entities are allowed to use their data. Other data privacy and/or user consent settings are also possible. Each data security system 180 can manage the security and privacy of user data for a set of users. In some implementations, each data security system 180 is managed by an e-mail provider, e.g., a free e-mail provider that provides free e-mail accounts to users. In this example, each e-mail provider can include a data security system 180 that enables users having an e-mail account with the e-mail provider to define and adjust data privacy settings and issues subscription tokens in accordance with the data privacy settings.

The environment 100 can include a data security system 180 for each participating e-mail provider, e.g., each e-mail provider that participates in a data privacy protection program, as described below with reference to FIG. 2. In addition, the environment 100 can include a data security system 180 that enables users that have an e-mail address with a non-participating e-mail provider or that do not have an e-mail address to manage their user privacy settings. In some implementations, the environment 100 can include a single (or multiple) data security systems 180 managed by a trusted party, e.g., by an industry group or government agency.

In general, the data security system 180 can manage the security and privacy of user data using subscription tokens. For each user, the data security system 180 can issue a subscription token to eligible publishers that request a subscription token from the data security system 180. An eligible publisher can be a publisher to which the user has subscribed, e.g., to receive content of the publisher. For example, as described below, when a user subscribes to a publisher, the publisher can request, from the data security system 180, a subscription token for the user. This request can indicate that the user has subscribed to the publisher and can include the e-mail address of the user (or other PII used to subscribe, e.g., if the data security system 180 is not an e-mail provider). Unless or until the user indicates to the data security system 180 that the user is not subscribed to the publisher, the data security system 180 can renew the subscription tokens for the publisher, as described in more detail below.

In some implementations, the data security system 180 can provide a user interface with interactive controls that enable the user to manage the user privacy settings across the entire (or at least a portion of the) online ecosystem. For example, the user interface can be a user interface of a website or native application that presents to the user, a list of all current (active) or past (expired) subscriptions of the user. In the particular example, the user interface can include a list of publishers to which the user has subscribed. In another example, the list can also include content platforms that select and/or provide digital components for presentation with contents of the publishers. For each publisher, the list can include each content platform with which the publisher partners for obtaining digital components for presentation with the publisher's content. In this way, the user has a transparent view of which online entities directly or indirectly provides digital content and/or digital components to the user and/or that has access to user's data. The user can identify, to the data security system 180 using the user interface, any fraudulent subscriptions, e.g., publishers to which the user has not subscribed but that have requested subscription tokens or for which the user has unsubscribed as these publishers would be included in the user interface. The user interface can also include interactive controls, e.g., buttons or selectors, that enable the user to designate subscribers as fraudulent or unsubscribed, or to designate fraudulent or unsubscribed publishers are subscribed (e.g., eligible) publishers. In this way, the user has control over which publishers the data security system 180 provides subscription tokens to and that can therefore send subscription tokens to content platforms (e.g., SSPs 150 and DSPs 160) for use in selecting digital components based on user data of the user.

The user interface can also provide a list of content platforms, such as SSPs 150 and DSPs, 160 and digital component providers 170. For example, the user interface can include a list of eligible content platforms that are eligible to receive subscription tokens for the user. The user interface can include interactive controls, e.g., buttons or selectors, that enable the user to designate the content platforms as eligible or ineligible (e.g., cannot receive subscription tokens and therefore is not allowed to receive, store, or use the user's data). Initially, when a user subscribes to a publisher, the content platforms associated with the publisher may be added as eligible content platforms for the user. For example, a publisher can have a set of SSPs 150 that procures digital components for presentation with the publisher's content. In this example, the set of SSPs 150 may be added as eligible content platforms initially after the user subscribes to the publisher. Thereafter, the user can designate the content platforms as ineligible using the user interface.

In some implementations, the user interface enables the user to define what user data each entity (e.g., publisher, content platform, or digital component provider) can receive, how the data can be used by each entity, and/or for how long the data can be stored and used. For example, the user interface can include, for each entity, a set of options for how the data can be used. The user can select zero or more of the options for each eligible entity.

The data security system 180 that manages the security and privacy of user data for a user can maintain the current data privacy settings of the user and can log the historical data privacy settings for the user. The data privacy settings can include data indicating the eligible and ineligible publishers, content platforms, and digital component providers 170 and the respective settings for each of these entities.

In some implementations, the data security system 180 can provide to a client device 110, an application 113 that can provide the user interface and interactive controls 116 to view and/or manage user subscriptions and data privacy settings. In some implementations, the data security system 180 can provide the user interface within a browser, e.g., as part of a web page.

As an example, assume that a user navigates to a website 142 of a publisher 140 that provides news articles. The user subscribes to the website 142 by providing the user's PII such as an e-mail address or phone number. The publisher 140, after receiving the PII from the user, can contact the data security system 180 to notify that a user with a particular PII has subscribed to the website 142. The data security system 180 in return may contact the user (e.g., by sending an e-mail to the user or by sending a short message service (SMS) text message to a device of the user), thereby prompting the user with a link to a website of the data security system 180 from where the user can view and verify the recent subscription to the website 142, manage other subscriptions, and adjust data privacy settings.

In some implementations, the data security system 180 is a technology platform implemented in hardware and/or software that is implemented by the e-mail provider of the user's e-mail address or by any trusted third party authority. In such implementations, the communications between the data security system 180 and the client device 110 can use the same network security and authentication protocols as used by the e-mail provider for providing e-mail service to the users.

In some implementations, when the user subscribes to a website 142 (or other content) of a publisher 140, the publisher 140 can generate a request for a subscription token and transmit the request over the network 105 to the data security system 180. The data security system 180 generates a subscription token for the user and transmits the subscription token to the publisher 140 over the network 105.

In general, each subscription token is specific to a user and a publisher, and is generated by a particular data security system 180. For example, the data security system 180 can generate, for a user, a respective subscription token for each eligible publisher of the user. The data security system 180 can generate the subscription token for a publisher in response to a request from the publisher. For example, the publisher can request a subscription token for a user in response to the user subscribing to the publisher and submit recurring requests for a renewed subscription token, e.g., prior to a current subscription token expiring.

In some implementations, each subscription token includes a set of data and a set of attachment elements. The set of data includes a first encrypted user identifier (also referred to as ephemeral user identifier). In some implementations, the user identifier of the first encrypted user identifier is the PII used by the user to register with publishers. For example, the user identifier can be an e-mail address of the user or a phone number of the user, depending on what PII the user used to register and was therefore included in the request from the publisher. In some implementations, the user identifier of the first encrypted user identifier is an internal identifier for the user maintained by the data security system 180. For example, the data security system 180 can map the internal identifier to the PII so that the PII is not included in the subscription token even in encrypted form to better protect user privacy and data security.

The first encrypted user identifier can be the user's e-mail address (or internal identifier or other PII) encrypted using an encryption key known only to the data security system 180, thereby hiding the plaintext e-mail address from all other entities that receive the subscription token. In this way, the user's PII is hidden from entities other than the publisher 140 to avoid any malicious activity using the PII by any untrusted and/or unverified entity. In some implementations, the data security system 180 generates anew encryption key, or anew nonce, after every predetermined time interval (e.g., 24 hours, two days, a week, etc.) to encrypt the user's e-mail address (or internal identifier or other PII) so as to generate a new first encrypted user identifier.

In some implementations, the data security system 180 generates the first encrypted user identifier by encrypting the PII or internal identifier using a probabilistic symmetric encryption algorithm such as AES128-GCM using a key (or a nonce) that is generated after a regular time interval. For example, the data security system 180 can generate a secret key (or nonce) every 24 hours or other appropriate time period. In some implementations, the probabilistic encryption algorithm generates a unique nonce for every encryption process. In this way, the first encrypted user identifier included in each subscription token for a user will vary even though the same identifier is being encrypted and the data security system 180 can still decrypt the first encrypted identifier. By changing the encrypted result in this way, entities that receive multiple subscription tokens for a particular user would not be able to correlate the multiple subscription tokens together or be able to determine that the tokens are for the same user.

The set of data of the subscription token can also include an expiration date of the subscription token. Each subscription token can be for a particular time period, as designated by the expiration time. For example, each subscription token can be for a day, week, month, or other appropriate time period. The subscription token defines what entities are eligible to receive, store, or use the data of the user during that time period and/or how each entity can use the user's data during the time period. Each entity that receives the subscription token can store the subscription token as verifiable proof that the entity was allowed by the user to receive, store, and/or use the user's data during that time period.

The set of data of the subscription token can include a confirmation status that represents whether the user has confirmed the subscription with the publisher. For example, the consent status can represent whether the user has logged into the data security system 180, accessed the user interface for managing data privacy settings, and confirmed the subscription to the publisher 140.

The set of data of the subscription token can also include user consent data that indicates the current data privacy settings of the user. For example, the user consent data can include a user consent string that represents which content platforms, publishers, and/or other entities have or do not have the consent from the user to obtain, store, access, or use the user's data. In some implementations, the subscription token further includes data that encodes the user's request to exercise consumer rights such as user's access and/or deletion of user data, such as browsing history. For example, the subscription token can be used to request that an entity delete all of the user's data. The set of data of the subscription token can also include use case specific data, e.g., the specific consumer right type and scope of applicability.

In some implementations, the set of data of the subscription token includes the domain of the publisher 140. For example, the subscription token can include the domain of the website 142 to which the user has subscribed. In other implementations, the set of data of the subscription token can also include the domain of the PII provider or the data security system 180 that issued the subscription token. For example, if the PII provided to the website 142 is the e-mail address of the user, the domain of the e-mail provider is included in the set of data of the subscription token. The domain of the PII provider and/or website can be in the form of an eTLD+1. The eTLD+1 is the effective top-level domain (eTLD) plus one level more than the public suffix. An example eTLD+1 is "example.com" where ".com" is the top-level domain.

In some implementations, the subscription token includes an attachment element for each of the eligible content platforms that select and/or provide digital components for presentation with content of the publisher 140. For example, a publisher 140 can maintain a list of content platforms such as SSPs 150 and/or DSPs 160 that interact to select and provide digital components for presentation with websites and/or application content published by the publisher 140. In one example, the list of content platforms is transmitted to the data security system 180 along with the request for the subscription token. The data security system 180 after receiving the list of content platforms, generates an attachment element for each of the content platforms in the list. Depending on the implementations, the subscription token can include an attachment element for each entity (e.g., except the publisher to which the subscription token is issued) that is eligible to receive and/or use the user's data.

As described above, the user can select which content platforms are eligible for receiving, storing, and/or using the user's data. In this example, the data security system 180 only generates and includes attachment elements for the eligible content platforms. In another example, the user may not allow a content platform to obtain or store user data but may allow the content platform to provide non-personalized digital components. In such an implementation, the subscription token may still include an attachment element for the content platform that includes the user consent specific to the content platform (e.g., is not allowed to provide personalized digital components). As this content platform is not allowed to use the user's data, the attachment element for this content platform would not contain a valid second encrypted user identifier (described below) for the user, thereby preventing the content platform from correlating subscription tokens with the user. Alternatively, the subscription token may not include an attachment element for the content platform. In this example, the subscription token may include the user consent specific to the content platform.

The attachment element for a content platform includes a second encrypted user identifier for the user. This user identifier can vary depending on the implementation, as described below. In either implementation, the user identifier that is used can be encrypted so that it is decryptable using an encryption and/or decryption key known only to the content platform (and, if necessary, the data security system 180). In this way, each content platform can only decrypt its respective attachment element to obtain the plaintext value of the user identifier. This user identifier enables the eligible content platforms to correlate multiple subscription tokens with the same user identifier, similar to how a first-party or third-party cookie can be used to correlate user data.

If a content platform is later designated as ineligible by the user or the user blocks the content platform from providing personalized content, the subscription tokens for the user would no longer include an attachment element for that content platform (or would not include a second encrypted user identifier for that content platform). As the content platform would not be able to decrypt the first encrypted user identifier or any of the second encrypted user identifiers of the attachment elements, the ineligible content platform would not be able to correlate any of the subsequent subscription tokens for the user with the previous subscription tokens of the user.

In some implementations, the second encrypted user identifier in the attachment element is a hashed value of the e-mail address (or other PII, such as the phone number of the user or a user identifier provided by the data security system 180 that is associated with the PII) of the user generated using a cryptographic hash function, such as SHA256, then encrypted using the encryption key of the content platform.

In some implementations, the second encrypted user identifier in the attachment element can be a user identifier assigned to the content platform by the data security system 180, encrypted using the encryption key of the content platform. The user identifier can be a pseudonymous identifier assigned to the content platform by the data security system 180. This user identifier can be sharded by recipient domain or not sharded. For example, the data security system 180 can generate a public/private key pair using an asymmetric key cryptographic algorithm. The user identifier in such a case can be the hashed value of the public key generated using a cryptographic hash function such as SHA256 that is truncated to a fixed length (e.g., 16 bytes). The user identifier is then encrypted using the encryption key of the content platform.

In some implementations, the data security system 180 can generate a public/private key pair using an asymmetric key cryptographic algorithm for each entity associated with the data security system 180. In such a scenario, the user identifier of the second encrypted user identifier for a particular entity can be the hashed value of the public key generated for the particular entity using a cryptographic hash function such as SHA256, e.g., that is truncated to a fixed length. In another example, the data security system 180 can use a single private key (referred to as master private key) for each user and cryptographic functions to generate the public and private key for each entity as opposed to creating and storing the public and private key, thereby conserving data storage. For example, the private key for a particular entity can be generated using a cryptographic function g(master private key, domain of the particular entity), where the cryptographic function g is applied to the master private key and domain of the particular entity represents the eTLD+1 of the particular entity (referred to as entity_eTLD+1). Similarly the public key for a particular entity can be generated using a cryptographic function h(master private key, domain of the particular entity), where the cryptographic function h is applied to the master private key and domain of the particular entity represents the eTLD+1 of the particular entity. In both the cases, the user identifier of the second encrypted user identifier for a particular entity can be the hashed value of the public key generated for the particular entity using a cryptographic hash function such as SHA256, e.g., that is truncated to a fixed length.

Content platforms such as the SSPs 150, DSPs 160 and digital component providers 170 can use the user identifiers of the second encrypted user identifiers to access user data to deliver customized digital components without having access to the PII of the user. In addition, this enables the user to reset the user identifier for the user, e.g., using the data privacy user interface, and therefore prevent correlation between the previous user identifier and the new user identifier.

In some implementations, each attachment element of the subscription token can also include a digital signature. This digital signature can be a digital signature of the set of data (or at least a portion of the set of data, e.g., the first encrypted user identifier) and the second encrypted user identifier of the attachment element. That is, the data security system 180 can generate the digital signature of an attachment element by digitally signing over the set of data of the subscription token and the second encrypted user identifier of the attachment element using an asymmetric private key of the data security system 180.

Each content platform can use the digital signature to verify that the content of the subscription token has not been altered after the subscription token was generated, e.g., during transit over the network 105. The content platform can verify the digital signature using an asymmetric public key corresponding to the private key used to generate the signature. If any piece of the set of data of the subscription token or the second encrypted user identifier changes after the digital signature is generated, the verification of the digital signature will fail.

In some implementations, the subscription token includes a digital signature that is generated by signing over the rest of the content of the subscription token, including the set of data and all of the attachment elements. In this way, the subscription token includes a single digital signature although the subscription token can include many attachment elements. In this way, the data size of the subscription token is reduced, resulting in reduced data storage requirements and reduced network bandwidth consumption when transmitting the subscription token over the network 105.

The subscription token thus allows each content platform to know whether or not it has consent to provide a digital component to the client device of a particular user. In particular, only if the content platform is able to decrypt the encrypted second user identifier of one of the attachment elements does it know it has consent to provide a digital component to the user identified by that second user identifier. Furthermore, it cannot decrypt the first user identifier or the second user identifier of any of the other content platforms and no unauthorized party is able to decrypt any of the first or second user identifiers. This helps provide improved security of user data. Furthermore, since the subscription token comprises an attachment element for each of the content platforms, only a single subscription token needs to be used (within a given expiry time limit, if applicable). This helps improve computational and network efficiency. The present technique thus provides improved security of user data in a computationally and network efficient way. Furthermore, in embodiments in which a digital signature is provided with each attachment element in the way described, security is further improved since it helps counterfeit subscription tokens to be detected (even if parts of them, e.g. the encrypted first user identifier or one of the attachment elements, was previously generated legitimately). At the same time, the efficiency associated with having a single subscription token is maintained. Such embodiments thus further help provide improved security of user data in a computationally and network efficient way.

In some implementations, each attachment element of the subscription token includes an identifier for a respective content platform to which the attachment element corresponds. Depending on the particular implementations, the scope of the identifier for the content platform may vary. For example, content platforms can be issued unique identifiers, which is different from the content platform's eTLD+1, by a data security system 180 (e.g., of an e-mail provider) such that each content platform can be uniquely identified within the data security system domain. In another example, one or more e-mail providers or a central authority can jointly maintain a globally recognized registry of all content platforms and issue unique identifiers to each of the multiple content platforms such that each content platform can be identified globally across the Internet.

By including the identifier for the content platform for each attachment element as part of the subscription token, each content platform can easily find its corresponding attachment element and decrypt the second decrypted user identifier. This saves computation resources that would otherwise be wasted attempting to decrypt the second encrypted user identifier of each attachment element until finally decrypts the right second encrypted user identifier.

As described above, the first encrypted user identifier changes with each encryption based on the probabilistic symmetric encryption algorithm used to encrypt the user identifier. Thus, this first encrypted user identifier is ephemeral and changes with each renewed subscription token and can be different for each publisher if the first encrypted user identifier is encrypted separately for each publisher. This prevents entities from tracking the user as the entities could if the first encrypted user identifier was stable over time and the same for each publisher that receives subscription tokens for the user. The second encrypted user identifier can be stable as the attachment elements for a given content platform would likely not be included in each subscription token for a given user. For example, a user can be subscribed to ten different publishers. Each publisher can use different content platforms. Thus, an attachment element for a given content platform would only be included in the subscription tokens for one of the ten publishers. In this example, if the first encrypted user identifier changes over time, an entity would not be able to correlate the subscription tokens sent to different publishers.

In some implementations, the publisher 140 after receiving the subscription token, transmits the subscription token to the client device 110, e.g., with a web page or other resource of the publisher 140. When the user of the client device 110 navigates to the website 142 that includes one or more digital component slots, the client device 110 generates a request for digital components for each of the one or more digital component slots, that is transmitted via the network 105 to the content platforms such as DSPs 160 along with the subscription token. Content platforms after receiving the requests for digital components, validate the subscription token using the digital signature of the subscription token that was generated by the data security system 180 and the public key of the data security system 180. In another example, the publisher 140 (or the SSP 150) can generate a request for digital components and transmit it over the network 105 to the DSPs 160 (or the digital component provider 170) along with the subscription token.

In some implementations, the publisher 140 after receiving the subscription token, maintains the subscription token. When the client device 110 generates a request for digital components for each of the one or more digital component slots in the website 142, and transmits it to the SSP 150 via the network 105, the SSPs 150 can transmit the request for digital components along with the subscription token via the network 105 to the content platforms such as DSPs 160 or the digital component provider 170.

Content platforms after validating the subscription token via the digital signature, can choose to provide or not provide digital components to the client device 110 (or the publisher 140, SSP 150) based on the validity of the subscription token. For example, the DSPs 160 may not provide digital components to the client device if the subscription token has passed the expiration date. In another example, a particular DSP 160 may not provide digital components to the client device 110 if the DSP 160 can't find an attachment element associated with the DSP 160 that contains the unique identifier of the particular DSP 160. If the subscription token is validated successfully, the content platform can decrypt the second encrypted user identifier and use data of the user corresponding to the user identifier to select a digital component, in accordance with the data privacy settings for the content platform as designated by the user.

The content platforms that receive subscription tokens can store the subscription tokens, e.g., to verify that the content platform used the user's data in accordance with the data privacy settings of the subscription token. In some cases, a content platform might receive the same subscription token multiple times before the expiration date. For example, the subscription tokens for a publisher can be set to expire after 24 hours. In this example, the user can navigate to the publisher's website multiple times in one day. Each time, a request for digital components can be generated that includes the same subscription token. Rather than store the subscription multiple times, e.g., once for each request, the content platform can store each subscription token once. The content platform can maintain an event log that indicates each event in which user data was used to select a digital component and, for each event, an identifier of the subscription token that allowed the content platform to use the user data. In this way, data storage requirements are reduced while still providing auditable verification that the content platform is acting within the user consent provided by the user to the content platform.

Figure 2:
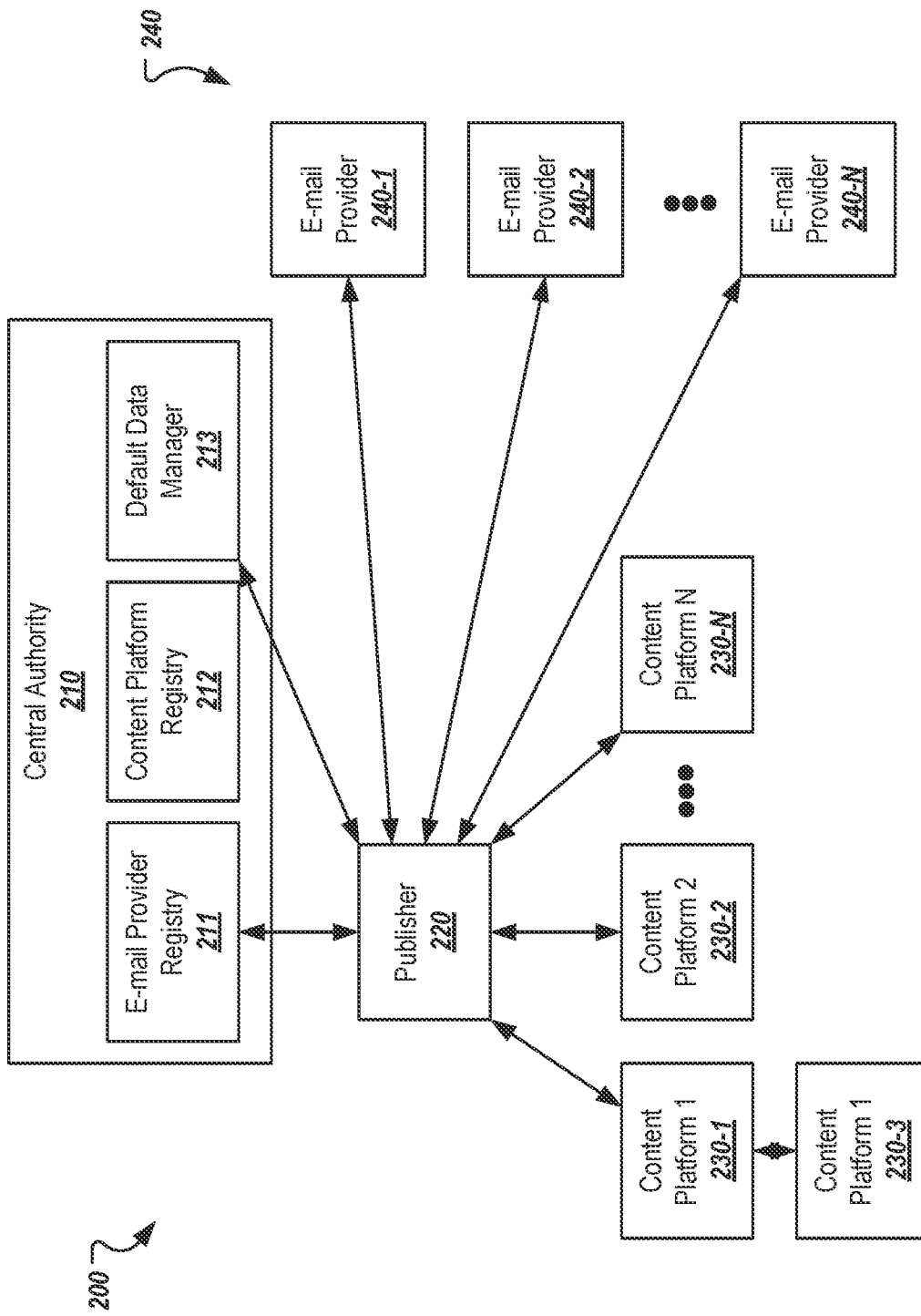
FIG. 2 is a block diagram of an example environment in which e-mail providers and a central authority manage the security and privacy of user data.

FIG. 2 is a block diagram of an example environment 200 in which e-mail providers 240 and a central authority 210 manage the security and privacy of user data. In this example, the e-mail providers 240 and a default data manager 213 of the central authority perform the functions of the data security system 180 of FIG. 1.

The central authority 210 can be a trusted party, such as an industry group or government agency. The central authority 210 can manage the use of e-mail addresses as identifiers for protecting the security and privacy of user data throughout the online ecosystem. For example, the central authority 210 can manage which e-mail providers participate in this data privacy protection program. The central authority 210 can maintain an e-mail provider registry 211 that identifies each e-mail provider 240 that is a participant and a content platform registry 212 that identifies each content platform (e.g., SSPs and DSPs) that is a participant. E-mail providers and content platforms can sign up with the central authority to participate in the data privacy protection program. The central authority 210 can remove participants that do not follow the rules of the data privacy protection program, e.g., that use users data in ways other than permitted by the users or use user data based on expired subscription tokens when renewed subscription tokens have been denied to the participant.

Each publisher 220 can interact with computing systems of the central authority 210 to identify which e-mail providers 240 and content platforms are participants. For example, when a user subscribes the publisher 220 with an e-mail address with a domain previously not encountered by the publisher 220, the publisher 220 can query the central authority 210 to determine whether the e-mail provider 240 for the domain participates in the data privacy protection program. If so, the publisher 220 can request a subscription token for the user from the e-mail provider. If not, the publisher 220 can request a subscription token for the user from the default data manager 213. The default data manager 213 can issue subscription tokens to publishers 220 for users that have e-mail addresses with non-participant e-mail providers or that use other PII to subscribe, e.g., that use a phone number to subscribe.

The publishers can provide the subscription token to participant content platforms. For example, the publisher 220 can provide, with a request for digital components, the subscription token for a user to participant content platforms 230-1 to 230-N that the publisher 220 partners with to obtain digital components for presentation with content (e.g., web pages of application content) of the publisher 220. The subscription token can include a respective attachment element for each of the content platforms 230-1 to 230-N. The content platforms 230-1 to 230-N can also forward the subscription token to other participant content platforms, e.g., if the subscription token identifies the other participant content platforms or includes an attachment element with an identifier for the other participant content platforms. The publisher 220 may not be allowed to forward the subscription token to non-participant content platforms.

Figure 3:
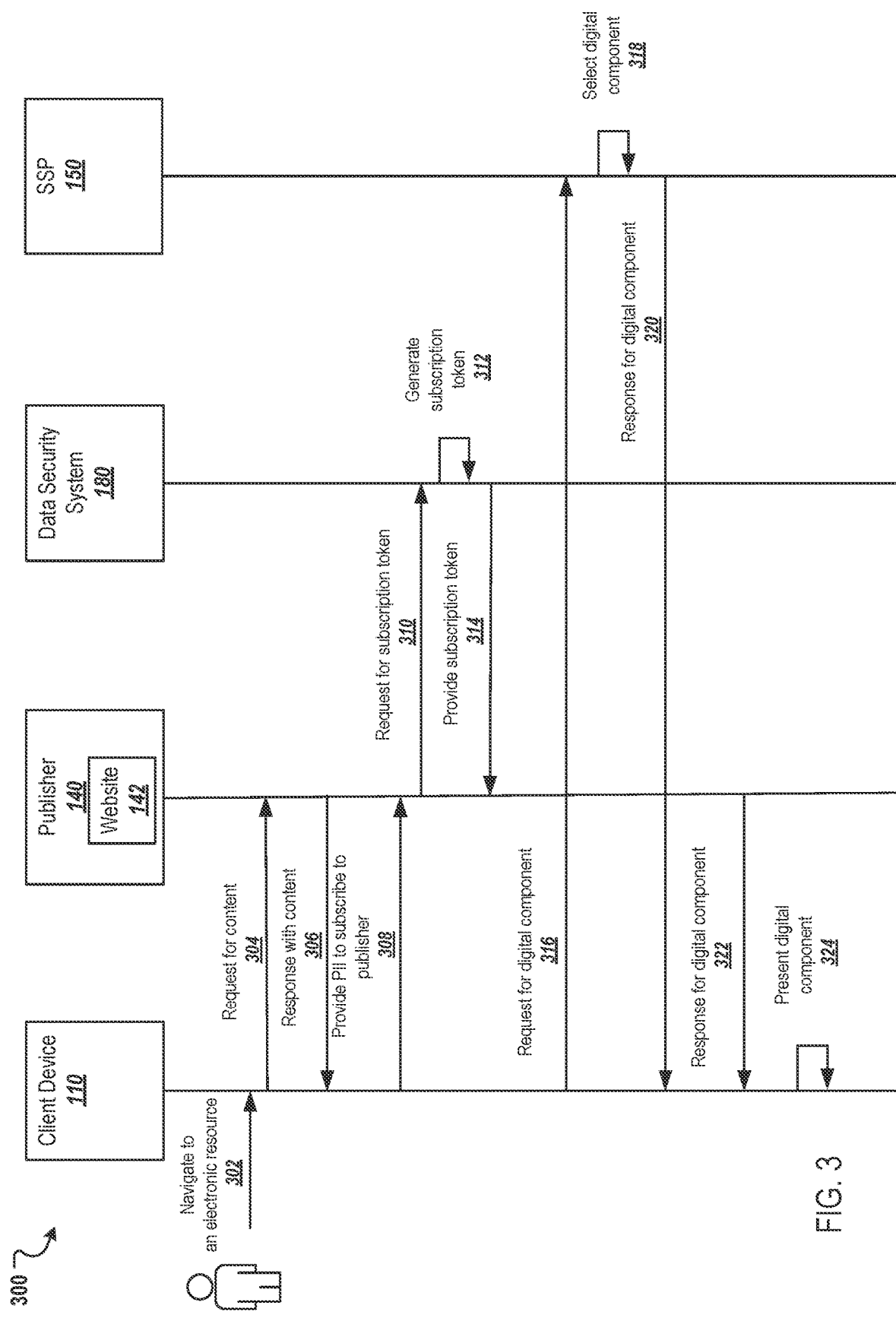
FIG. 3 is a swim lane diagram of an example process for using a subscription token to provide a digital component.

FIG. 3 is a swim lane diagram that illustrates an example process 300 for using a subscription token to provide a digital component. Operations of the process 300 can be implemented, for example, by the data security system 180, the client device 110, the publisher 140 and the SSP 150. Operations of the process 300 can also be implemented as instructions stored on one or more computer readable media which may be non-transitory, and execution of the instructions by one or more data processing apparatus can cause the one or more data processing apparatus to perform the operations of the process 300.

In this example, the user of the client device 110 uses an application 112 such as a web browser to access a website 142 of the publisher 140 hosted on a web server. To access the website 142, the client device 110 can initiate a request for the website 142, and the web server that hosts the website 142 can respond to the request by sending computer-executable instructions and/or data that initiate the presentation of a web page (or other electronic resource) at the client device 110.

The user of the client device 110 navigates to a website 142 (302) of the publisher 140. For example, the user of the client device 110 can use an application 112 (e.g., browser) to visit a website 142 by specifying a reference (e.g., URL).

The client device 110 generates a request for content and transmits the request over the network 105 to the publisher (304). For example, after the user of client device 110 navigates to the website 142, the application 112 generates a request and transmits it over the network 105 to the web server that hosts the website 142.

The request for digital content can be transmitted, for example, over a packetized network 105, and the content requests themselves can be formatted as packetized data having a header and payload data. The header can specify a destination of the packet and the payload data can include any of the information discussed above.

The publisher 140, e.g., a web server or content server of the publisher 140, responds with the content (306). For example, after receiving the request for digital content (e.g., the website 142) from the client device 110, a web server can respond by transmitting computer-executable instructions and data that initiate presentation of a resource (e.g., web page) of the website 142 at the client device 110. The response can include data related to the website that is transmitted, for example, over a packetized network 105, and the content themselves can be formatted as packetized data.

The user of the client device 110 provides the user's PII (308) and subscribes to the publisher 140 of the website 142. For example, assume that the publisher is a news organization and the website 142 provides news articles. The user can subscribe to the website 142 of the publisher 140 to receive news articles on a daily basis. The user of the client device 110 can provide the user's email address (or phone number or other PII) to the publisher 140 of the website 142 in exchange for the service of receiving news articles.

The publisher 140 transmits a request for subscription token (310) to the data security system 180. For example, after receiving an e-mail address from the user of the client device 110, the publisher 140 identifies the domain of the email address, e.g., the e-mail provider of the e-mail account for the user, and transmits a request for a subscription token to the data security system 180 of the e-mail provider. If the PII is not an e-mail address or if the e-mail provider is not a participant, the publisher 140 can transmit the request to another data security system 180, such as the default data manager 213 of FIG. 2.

The data security system 180 generates a subscription token (312). After receiving the request for subscription token, the data security system 180 generates a subscription token for the publisher 140 and the user. As described above, the subscription token includes a set of data that includes, among other things, a first encrypted user identifier. In some implementations, the first encrypted user identifier is the encrypted PII or an internal identifier of the user that is encrypted using the encryption key of the data security system 180 so that no party other than the data security system 180 can extract from the subscription token the email address of the user in plaintext.

In some implementations, the subscription token includes an attachment element for each of the content platforms (e.g., SSPs and/or DSPs) that manages the provisioning of digital components for the publisher 140. Each attachment element in the subscription token is designated to be used by a particular content platform. As described above, each attachment element includes a second encrypted user identifier for the user and can include a digital signature generated based on the set of data of the subscription token and the second encrypted user identifier. In other examples, the subscription token includes a single digital signature generated based on the set of data of the subscription token and all of the attachment elements of the subscription token.

To support authorized use of the subscription token, the attachment includes an identifier for a respective content platform such as the DSPs 160 or the digital component providers 170 that provides digital components to the publisher 140. The scope of the identifier of the content platforms may vary according to the implementation. For example, content platforms can be issued unique identifiers by the data security system 180 such that each content platform can be uniquely identified within the data security system's domain. In another example, one or more e-mail providers or a central authority can jointly maintain a globally recognized registry of all content platforms and issue unique identifiers to each of the multiple content platforms such that each content platform can be identified across multiple domains.

The data security system 180 transmits the subscription token to the publisher 140 (314). The publisher 140 can store the subscription token for use in obtaining digital components for presentation to the user with web pages or other content of the publisher.

The client device 110 transmits a request for digital components to the SSP 150 (316). For example, after subscribing to the publisher 140, the user can navigate to the website 142 of the publisher again, e.g., to view more news articles. The web pages of the publisher can include one or more digital component slots that include scripts or other code that causes the client device 110 to generate and transmit the request for digital components. The scripts can also obtain the subscription token for the user from the publisher 140 (or it can be part of the web page) and include the subscription token in the request.

The client device 110 can send the request for digital components to the SSP 150 for the publisher 140. For example, the application 112 can generate one or more requests for digital components based on the one or more digital component slots. In a particular example, the application 112 can generate a request for digital components based on tags of the digital component slots and transmit the request to the SSP 150 over the network 105.

The request for digital components can be transmitted, for example, over a packetized network 105, and the component requests themselves can be formatted as packetized data having a header and payload data. The header can specify a destination of the packet and the payload data can include any of the information discussed above.

The SSP 150 can transmit the request for digital components to one or more DSPs 160. As mentioned before, content platforms such as digital component providers 170 can use one or more DSPs 160 to automate the process of distributing digital components for presentation with the applications. After receiving the request, the SSP 150 can interact with one or more DSPs and transmit a corresponding request for digital components.

In some implementations, the request for digital components can include the subscription token generated by the data security system 180 that was transmitted to the publisher 140 and the SSP 150. For example, the SSP 150 after receiving a request for digital components from the client device 110, generates a request for a digital component that includes the subscription token and transmits it over the network 105 to the DSPs 160. The subscription token represents the user's preference of user privacy and content platforms that are allowed to provide digital components to the client device 110.

In some implementations, the subscription token can include a list of content platforms that can receive the subscription token or, for each attachment element, the content platform corresponding to the attachment element. The SSP 150 can use this data to identify the DSPs 160 to which to submit requests. For example, the SSP 150 can send a request to each DSP 160 identified in the subscription token, but not to a content platform that is not identified in the subscription token.

The DSPs 160 can select digital components based on the subscription token and optionally previously received subscription tokens for the user. As mentioned before with reference to FIG. 1, the subscription token represents the user's preference of content platforms that are eligible to use the user's data in selecting digital components for providing to the client device 110. For example, the DSPs 160 after validating the subscription token via the digital signature, can choose to provide or not provide digital components to the client device 110 (or the publisher 140, SSP 150) based on the contents of the authentication token. For example, the DSPs 160 can verify the digital signature using the asymmetric public key corresponding to the private key that was used to generate the signature by the data security system 180. If any piece of the set of data of the subscription token or the second encrypted user identifier changes after the digital signature was generated by the data security system 180, the verification of the digital signature will fail and the DSPs 160 will not provide digital components to the SSPs 150. In another example, the DSPs 160 will not provide digital components to the SSPs 150 if the subscription token has passed the expiration date. In another example, a particular DSP 160 will not provide digital components to the SSPs 150 if the particular DSP 160 can't find the attachment element associated with the particular DSP 160 with the unique identifier of the particular DSP 160.

The DSPs 160 can select digital components based on multiple subscription tokens received for the user. For example, a DSP 160 can decrypt the second encrypted user identifier for the DSP and use that user identifier to correlate the current subscription token with previously received data for the user, e.g., from previously received subscription tokens for the user. The DSP 160 can use this data, e.g., along with other data such as contextual data identifying the publisher 140, the web page, information about the digital component slots of the web page, etc. to select one or more digital components for presentation with the web page.

The DSPs 160 transmits data for the one or more selected digital components to the SSP 150. For example, one or more DSP 160 selected based on the subscription token can respond to the request for digital components of the SSP 150 by transmitting the one or more selected digital components or data identifying the digital components (e.g., creative elements that include instructions for presenting the digital components). For each digital component, the DSP 160 can also generate or select a selection parameter for the digital component. The DSP 160 can then transmit, to the SSP 150, the selection parameter and data for the digital component.

The SSP 150 selects a digital component from the digital components identified by the DSPs (318). For example, the SSP 150 can select the digital component that has the highest expected amount of the publisher 140, e.g., based on the selection parameters for the digital components.

The SSP 150 transmits data for the selected digital component to the client device 110 (322). For example, the SSP 150 can transmit the digital component or the creative for the digital component to the application 112 executing on the client device 110 over the network 105.

The application 112 presents the received digital component (324). For example, application 112 can present the digital component with the web page of the publisher 140.

Figure 4:
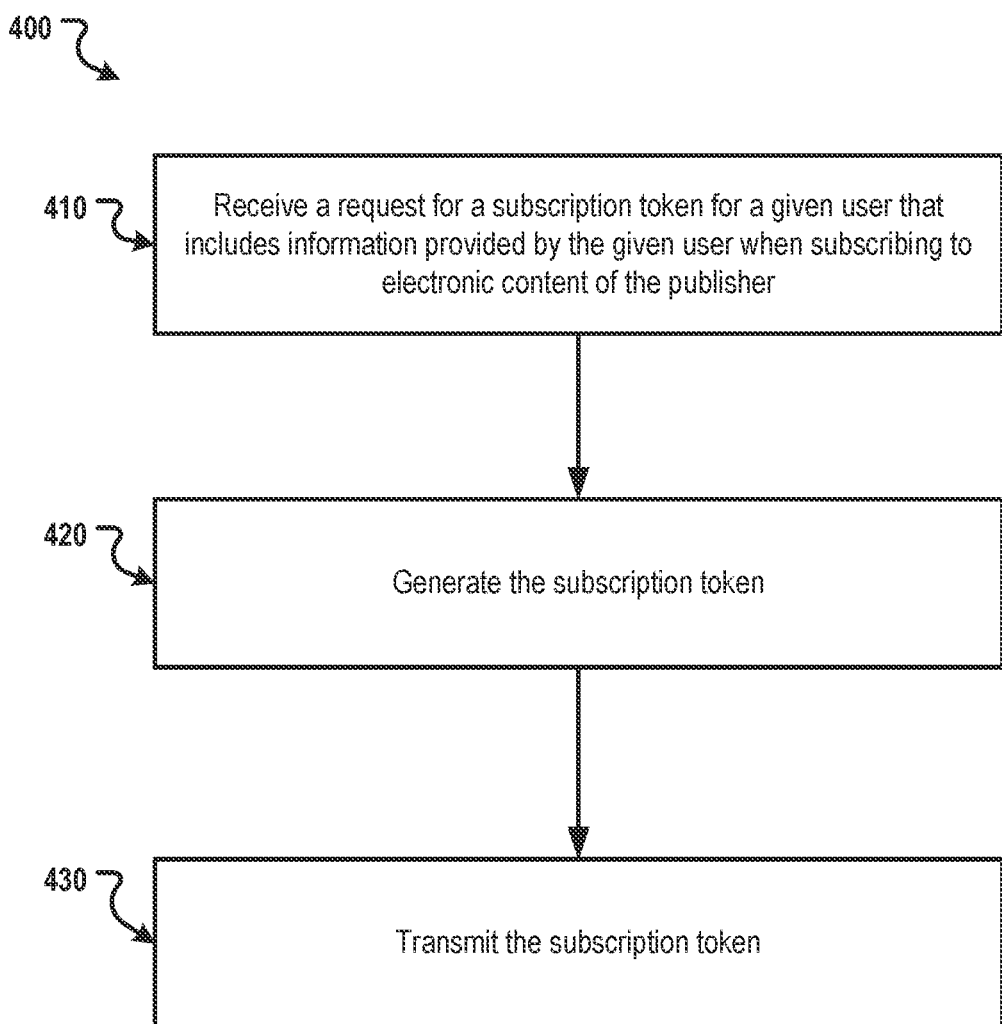
FIG. 4 is a flow diagram of an example process for generating a subscription token.

FIG. 4 is a flow diagram illustrating the process 400 of generating a subscription token. Operations of the process 400 can be implemented, for example, by the data security system 180 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400. For brevity, the process 400 is described in terms of the data security system 180 of FIG. 1

A request for a subscription token for a given user is received (410). The request can include information provided by the given user when subscribing to electronic content of the publisher. For example, a user can navigate to a website 142 that is published by the publisher 140 that provides news articles. The user subscribes to the website by providing the user's PII, such as an e-mail address. After receiving the PII of the user, the website 142 of the publisher 140 generates a request for a subscription token for the user and transmits the request over the network 105 to the data security system 180.

The data security system 180 generates a subscription token (420). After receiving the request for the subscription token, the data security system 180 generates a subscription token that includes a first encrypted user identifier that enables the data security system 180 to correlate subscription tokens with the user, but prevents other recipients of the subscription token from performing the correlation. In some implementations, the first encrypted user identifier is the e-mail address of the user or other PII used to subscribe to the publisher, encrypted using an encryption key known only to the data security system 180. As described above, the subscription token can further include an expiration date, a confirmation status, user consent data, and/or the domain of the publisher. The user consent data of each subscription token for a user can indicate the current data privacy settings for the user at the time at which the subscription token is generated.

The subscription token also includes one or more attachment elements for each of one or more eligible content platforms that partner with the publisher 140 to provide digital components to the publisher 140. The eligible content platforms can include only those that are participants in a data privacy protection program, that are designated as eligible (e.g., not blocked) by the user, and that are partners of the publisher 140 as indicated by the publisher 140. Each attachment element in the subscription token for a particular content platform includes a second encrypted user identifier generated by encrypting the PII (or crypto-hashed PII) used to subscribe to the publisher (e.g., the e-mail address of the user) or a pseudonymous identifier (different from the PII) using an encryption scheme that only the particular content platform can decrypt (or optionally that the data security system 180 can also decrypt). For example, the encryption scheme can be asymmetric encryption using the content platform's public key. In another example, the data security system 180 and the particular content platform can create a shared secret key that enables the data security system 180 to encrypt and the particular content platform to decrypt with a symmetric key encryption algorithm.

Each attachment element in the subscription token for a particular content platform can also include an identifier for the corresponding content platform to which the attachment element corresponds. Depending on the particular implementations, the scope of this identifier for the content platform may vary. In some implementations, the subscription token includes a list of content platforms for which an attachment element is included with the subscription token. In some implementations, each attachment element in the subscription token can also include a digital signature generated by digitally signing over the set of data of the subscription token and the second encrypted user identifier of the attachment element using an asymmetric private key of the data security system.

The data security system 180 transmits the subscription token to the publisher 140 (430). For example, the publishers 140 (or the SSPs 150) can be responsible for collecting digital components from the DSPs 160 (or the digital component providers 170) for the digital component slots for the website 142 or applications of the publisher 140. The subscription token is transmitted to the publishers 140 via the network 105 for distribution to the SSPs 150 and/or DSPs 160 (or the digital component providers 170). For example, the publisher 140 can include the subscription token for a user in code for an electronic resource (e.g., web page) transmitted to the client device of the user. In another example, the code of the digital component slots of the electronic resource can obtain the subscription token from the publisher 140, e.g., in response to the code being executed by the client device. In this way, the client device 110 can include the subscription token in requests for digital components transmitted by the client device to the content platforms, e.g., to the SSPs 150 and the DSPs 160.

As mentioned before, the data security system 180 can provide the user of the client device 110 with a platform to manage subscriptions to publishers 140 and provide access or block content platforms (e.g., that partner with the publishers 140) from using user data that includes PII, user's browsing history etc. In some implementations, the subscription tokens have an expiration date and the publishers 140 have to get renewed subscription tokens for each user in order to have valid subscription tokens. For example, assume that a particular publisher 140 has been providing a subscription token for a user to an SSP 150. Also assume that this subscription token has expired (or is about to expire) based on the expiration date of the subscription token. In such a scenario, the publisher 140 has to get a renewed subscription token from the data security system 180 to continue sending subscription tokens to content platforms, and thereby enabling the content platforms to use the user's data in selecting digital components.

In some implementations, the publisher 140 generates a recurring renewal request that is transmitted to data security system 180. For example, if the subscription tokens expire after 24 hours, the publishers 140 can submit a request every 24 hours for a renewed subscription token. Other appropriate time periods can also be used. In another example, the publisher 140 can have a computing system that is configured to generate a request for a user in response to the user's subscription token being within a threshold duration of expiring. Each of these requests can include the first encrypted user identifier that was generated by the data security system 180 for the prior subscription token. After receiving the renewal requests, the data security system 180, for each recurring renewal request, generates a renewed subscription token that includes an updated first encrypted user identifier that is different from the first encrypted user identifier, as well as the latest user consent status, and transmits the renewed subscription token to the publisher 140. An example process of renewing subscription tokens is further explained with reference to FIG. 5.

Figure 5:
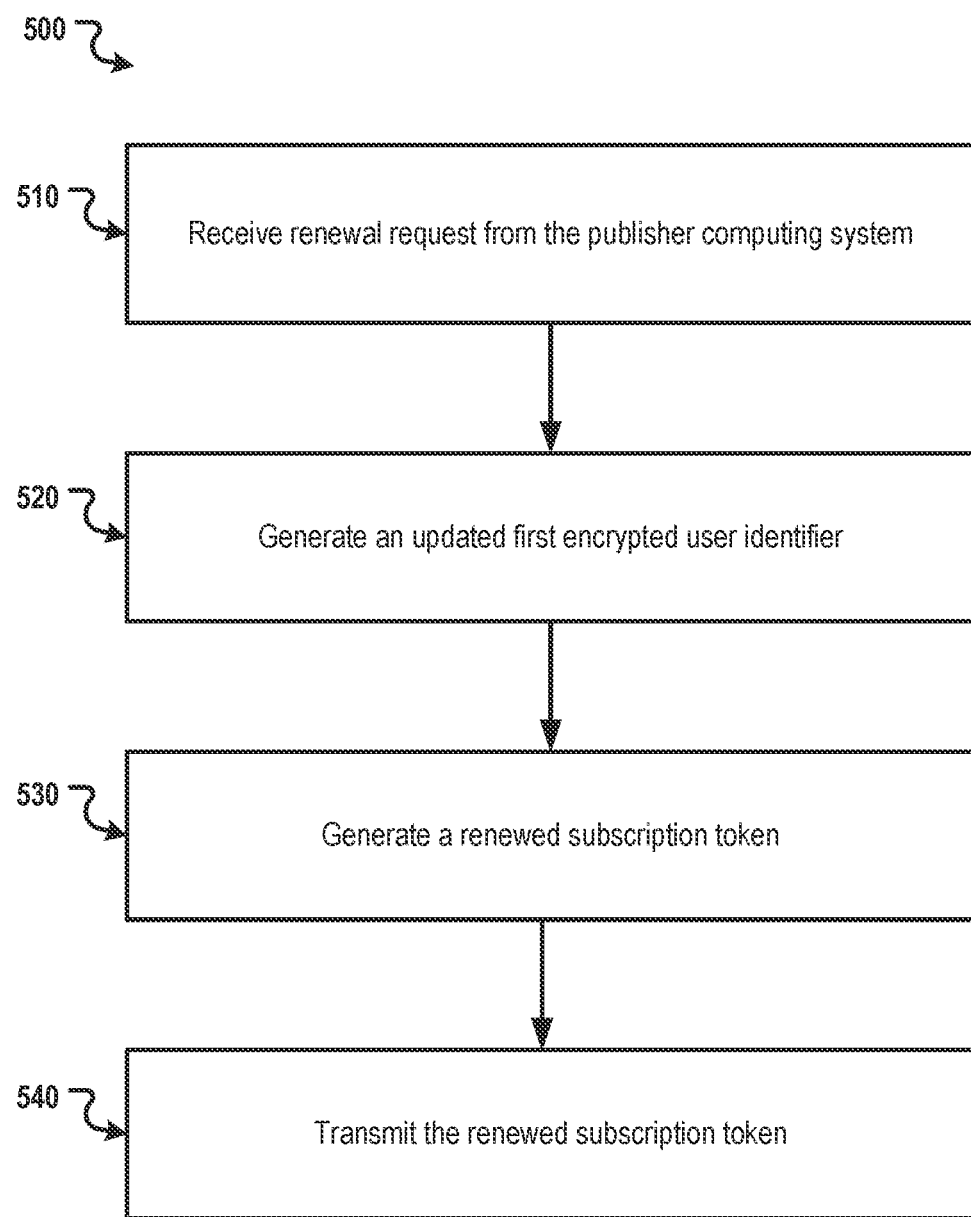
FIG. 5 is a flow diagram of an example process for renewing a subscription token.

FIG. 5 is a flow diagram illustrating the process 500 of renewing a subscription token. Operations of the process 500 can be implemented, for example, by the data security system 180. Operations of the process 500 can also be implemented as instructions stored on one or more computer readable media which may be non-transitory, and execution of the instructions by one or more data processing apparatus can cause the one or more data processing apparatus to perform the operations of the process 500.

The data security system 180 receives a renewal request from the publisher computing system (510). For example, assume that a user (subscriber) has subscribed to a website 142 of the publisher 140 by providing the user's PII such as e-mail address or phone number. After receiving the PII, the publisher 140 generates and transmits a request for subscription token to the data security system 180. The data security system 180 generates a subscription token that is valid for a particular time period, e.g., the next 24 hours or another appropriate time period. In this example, the set of data in the subscription token includes an expiration date that is 24 hours from the time when the token was generated. The publisher 140 after receiving the subscription token distributes the subscription token to registered entities that provide digital components to the publisher 140 along with requests for digital components. Towards the end of the expiration date (e.g., within a threshold amount of time of the expiration date), the publisher 140 can request a renewal of the subscription token that includes the current subscription token that is about to expire (or at least the first encrypted user identifier for the expiring subscription token). The publisher can submit recurring requests for a renewed subscription token to the data security system 180, e.g., prior to a current subscription token expiring.

The data security system 180 generates an updated first encrypted user identifier (520). After receiving a renewal request that includes the current subscription token that is about to expire, the data security system 180 decrypts the first encrypted user identifier (ephemeral user identifier) using the secret key that was used to generate the first encrypted user identifier while generating the current subscription token (or another encryption key that corresponds to this secret key). Decrypting the first encrypted user identifier generates the plaintext user identifier, e.g., the PII of the user or the internal account identifier for the user. The data security system 180 uses the plaintext user identifier to identify the user for which the current subscription token was generated by comparing the user identifier that was generated to a list of user identifiers of multiple users for which the data security system 180 issued subscription tokens. After identifying the user and/or the user's identifier, the data security system 180 generates an updated first encrypted user identifier that is different from the first encrypted user identifier of the current subscription token using a probabilistic symmetric encryption algorithm and a secret key that can be different from the secret key that was used to generate the first encrypted user identifier of the current subscription token. By changing the encrypted result in this way, entities that receive multiple subscription tokens for a particular user would not be able to correlate the multiple subscription tokens together or be able to determine that the tokens are for the same user based on the first encrypted user identifier. In this way, only recipients for which the subscription token includes an attachment element with a second encrypted user identifier that the recipient can decrypt can correlate multiple subscription tokens for the user.

The data security system 180 generates a renewed subscription token (530). As described with reference to FIG. 1, the data security system 180 generates a renewed subscription token that includes the updated first encrypted user identifier and an updated set of data such as an updated expiration date, updated user consent data (e.g., an updated user consent string) that represents whether one or more content platforms have or do not have the consent from the user to use the user data for providing digital components, etc. The updated consent settings can reflect any changes that the user made using the data privacy user interface since the previous subscription token was generated. For example, if the user blocked a particular content platform from using the user's data, the updated consent settings can reflect the change and the renewed subscription token will not include an attachment element for the particular content platform.

The data security system 180 transmits the renewed subscription token to the publisher 140 (540). For example, the publishers 140 (or the SSPs 150) can be responsible for collecting digital components from the DSPs 160 (or the digital component providers 170) for the digital component slots for the website 142 or applications of the publisher 140. The renewed subscription token is transmitted to the publishers 140 via the network 105 for distribution to the SSPs 150 and/or DSPs 160 (or the digital component providers 170). For example, the publisher 140 can include the renewed subscription token for a user in code for an electronic resource (e.g., web page) transmitted to the client device of the user. In another example, the code of the digital component slots of the electronic resource can obtain the renewed subscription token from the publisher 140, e.g., in response to the code being executed by the client device. In this way, the client device can include the renewed subscription token in requests for digital components transmitted by the client device to the content platforms, e.g., to the SSPs 150 and the DSPs 160.

In some implementations, when the user of client device provides PII such as email address to the website 142 of the publisher 140, a script in the website 142 executing on the client device 110, identifies the e-mail provider for the respective e-mail address provided by the user. In situations when the identified e-mail provider does not implement the techniques and methods described previously (e.g., is not a participant), the script can request a subscription token from another data security platform 180, e.g., the default data manager 213 of FIG. 2. In either case, the data security platform 180 can send an e-mail that includes a URL (or link that references a URL) to a website of the data security system 180 that provides a user interface for the subscription and privacy settings, to the user's email address prompting the user to check the subscription and privacy settings. The URL included in the e-mail can include an ephemeral user identifier, e.g., the email address encrypted with a probabilistic symmetric key encryption algorithm using the secret key of the data security system 180. After interacting with the URL, the data security system 180 provides computer-executable instructions and data of the website to the client device 110 for presentation of the website to the user using the application 112. In some implementations, a web cookie is placed in the cookie jar of the application 112 to identify the application 112 during any future communication with the data security system 180.

As mentioned before, PII is user-related information, which may be sensitive. Unintended sharing of such information can raise privacy concerns. Assume that the user of the client device 110 navigates to a website that is published by the publisher 140 that provides news articles. To receive news articles, the user can subscribe to the website using the user's phone number instead of the user's email address. When an e-mail address is used, the e-mail provider can provide the authentication mechanisms to ensure that the user is genuine when viewing or modifying data privacy settings. However, there may not be the same authentication mechanisms when a phone number is used as the PII for subscribing to publishers.

After receiving the phone number of the user for subscription, the website 142 of the publisher 140 generates a request for a subscription token and transmits the request via the network 105 to the data security system 180. The data security system 180 can send an SMS message to the client device 110. In this example, the client device 110 has phone capabilities, e.g., cellular capabilities. For example, the client device 110 can be a smartphone, tablet, laptop or a personal computer via the network 105, which can include a cellular network or the Internet.

In some implementations, the SMS message sent to the user's client device 110 by the data security system 180 includes a resource locator such as a URL to the dashboard or the website of the data security platform 180 and an ephemeral user identifier for the user. The ephemeral user identifier for the user is generated by the data security system 180 by encrypting the user's phone number (or an internal identifier for the user) using a probabilistic symmetric encryption algorithm and a secret key known to the data security system 180.

In some implementations, after receiving the SMS message, and after the user's interaction with the URL (or link referencing the URL), the user can be redirected to either an application provided by the data security system 180 in the client device 110 (e.g., application 113) or a website of the data security system 180 via a browser-based application (e.g., application 112) on the client device 110. In either case, the user is presented with an interactive user interface to manage data privacy settings. For example, the user can designate subscriptions as fraudulent, block content platforms, or designate how recipients of the user's data can use the data, as described above.

In some implementations, the ephemeral user identifier that was provided to the client device 110 via the SMS message is stored on the client device 110. For example, assume that after interacting with the URL that was provided via the SMS message to the client device 110, the user is redirected to an application 113 provided by the data security system 180 that is executing on the client device 110. The application 113 parses the SMS message and extracts the ephemeral user identifier of the user and stores the ephemeral user identifier in the client device 110. This is further explained with reference to FIG. 6.

Figure 6:
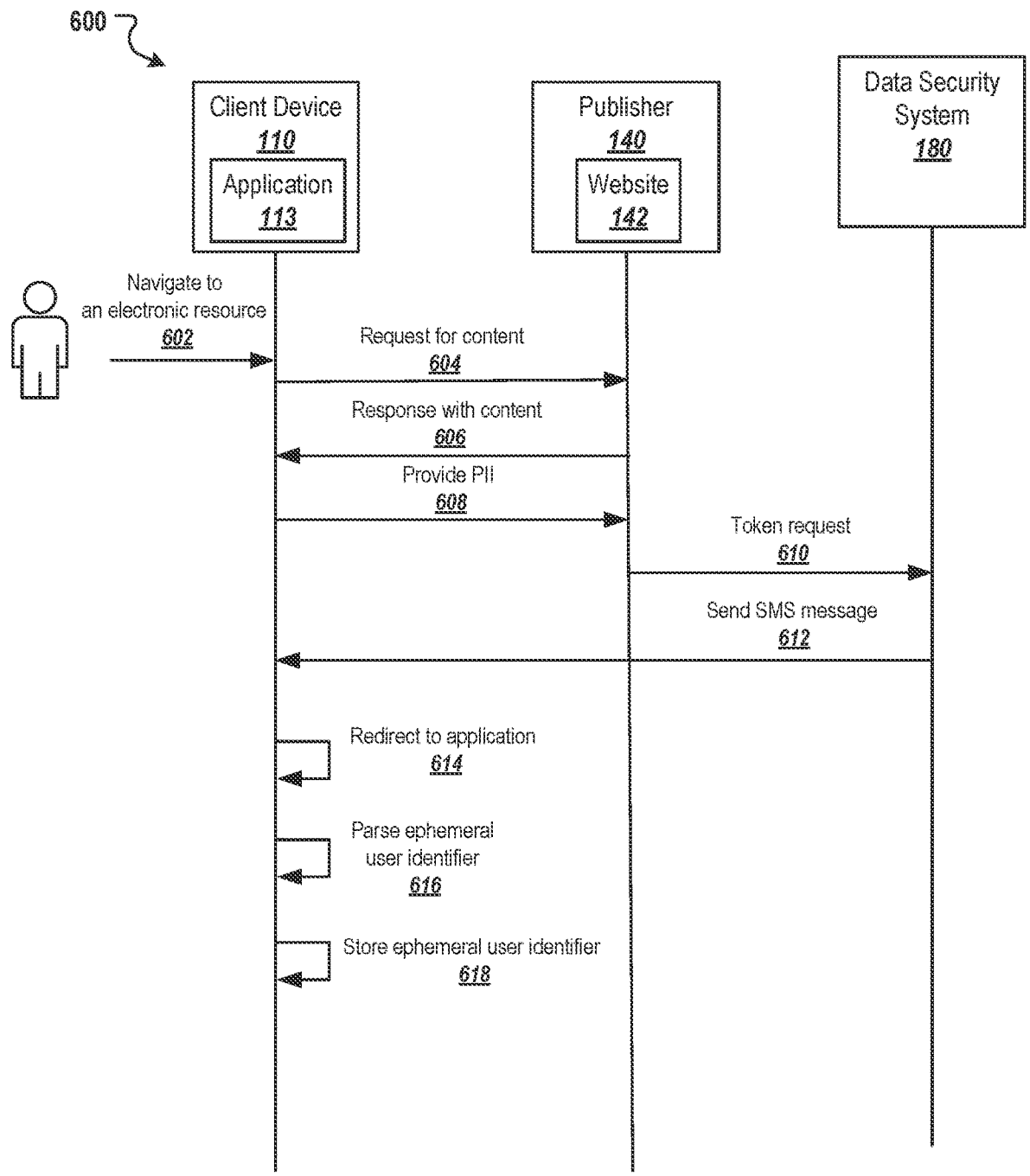
FIG. 6 is a swim lane diagram of an example process for receiving an ephemeral user identifier using an application provided by the data security system.

FIG. 6 is a swim lane diagram that illustrates an example process 600 of receiving an ephemeral user identifier by the client device. Operations of the process 600 can be implemented, for example, by a client device 110, a computing system of a publisher 140, a data security system 180. Operations of the process 600 can be implemented as instructions stored on one or more computer readable media which may be non-transitory, and execution of the instructions by one or more data processing apparatus can cause the one or more data processing apparatus to perform the operations of the process 600. Although this process 600 is described in terms of a web browser downloading a web page, a native application can be used in a similar process.

The user of the client device 110 navigates to a website 142 (602) of the publisher 140. For example, the user of the client device 110 can use a browser application 112 to visit a website 142 by specifying a resource locator (e.g., URL) or select a link of a search result.

The client device 110 generates a request for content and transmits the request over the network 105 to the publisher (604). For example, after the user of client device 110 specifies the website 142 by using a reference (e.g., URL), the application 112, i.e. the web browser running on the client device 110 generates a request for digital content (i.e. the website 142) and transmits it over the network 105 to the web server of the publisher 140 hosting the website 142.

The request for digital content can be transmitted, for example, over a packetized network 105, and the content requests themselves can be formatted as packetized data having a header and payload data. The header can specify a destination of the packet and the payload data can include any of the information discussed above.

The publisher 140, e.g., a web server or content server of the publisher 140, responds with the content (606). For example, after receiving the request for content (i.e. the request for the website 142) from the client device 110, the web server hosting the website 142 can respond by transmitting computer-executable instructions and data that initiate presentation of a web page at the client device 110. The response can include data related to the web page that is transmitted, for example, over a packetized network 105, and the content themselves can be formatted as packetized data.

The user of the client device 110 provides the user's phone number (608) and subscribes to the publisher 140 of the website 142. For example, assume that the website 142 provides news articles. The user can subscribe to the website 142 of the publisher 140 to receive news articles on a daily basis. The user of the client device 110 provides the user's phone number to the publisher 140 of the website 142 in exchange for the service of receiving news articles.

The publisher 140 transmits a token request (610) to the data security system 180. For example, after receiving the phone number from the user of the client device 110, the publisher 140 generates and sends the token request to a data security system 180, e.g., the default data manager 213 of FIG. 2.

The data security system 180 transmits a SMS message to the client device 110 (612). For example, the data security system 180 can send an SMS message to a smartphone, corresponding to the phone number, e.g., the smartphone that owns the phone number. The SMS message sent to the user's client device 110 by the data security system 180 can include a resource locator (e.g., URL) to the dashboard or the website of the data security platform 180 and an ephemeral user identifier for the user. The ephemeral user identifier for the user is generated by the data security system 180 by encrypting the user's phone number (or internal identifier) using a probabilistic symmetric key encryption algorithm and a secret key known to the data security system 180. Thus, for practical purposes, the ephemeral user identifier is encrypted and is changed over time based on the encryption algorithm used to generate the ephemeral user identifier. The ephemeral user identifier can be included as a parameter of the URL.

The user is redirected to an application 113 (614). For example, after receiving the SMS, and after the user's interaction with the URL, the user is redirected to an application provided by the data security system 180 and installed or otherwise running on the client device 110 (for e.g., application 113). The application 113 can receive information from the data security system 180 regarding user subscriptions and privacy settings and provides an user interface to present that information to the user. The application 113 can further include controls for the users to select and manage individual subscriptions and data privacy settings.

The application 113 parses the ephemeral user identifier (616). After being redirected to the application 113, the application 113 parses the SMS message and extracts the ephemeral user identifier of the user and stores the ephemeral user identifier (618) at the client device 110. In some implementations, the application 113 stores the ephemeral user identifier in a keystore 114 (or keychain) of the trusted program 111 (e.g., operating system) of the client device 110 or other secure storage at the client device 110.

In situations, when the user is redirected to an application 113 that is provided by the data security system 180 to access and modify subscription settings, the application 113 accesses user subscription data from the data security system 180. In such situations, to verify that the application 113 executing on the client device 110 is not compromised, the client device implements additional security measures while communicating with the data security system 180. For example, the application 111 can interact with a trusted program 111 to generate an attestation token that can be verified by the data security system 180. Generally, the trusted program 111 is difficult to infiltrate, and the amount of time and effort that a perpetrator would need to expend to tamper with the trusted program 111 is prohibitively high. Additionally, because the trusted program 111 is provided and maintained by a reliable source, any vulnerabilities that arise can be addressed by the source. This is further explained with reference to FIG. 7. Thus, a user is able to modify data privacy settings based only on their phone number. A phone number is a small amount of numerical data already uniquely allocated to the user. This provides improved convenience to the user (e.g. they do not need to generate additional identification data such as a unique username). Furthermore, the small amount of numerical data is computationally efficient to process. Furthermore, the use of the attestation token and, in some implementations, the use of encryption, a digital signature and/or a public key in the way described helps improve security of the user's data. A more computationally efficient, secure way of allowing a user to modify their data privacy setting(s) is therefore provided.

Figure 7:
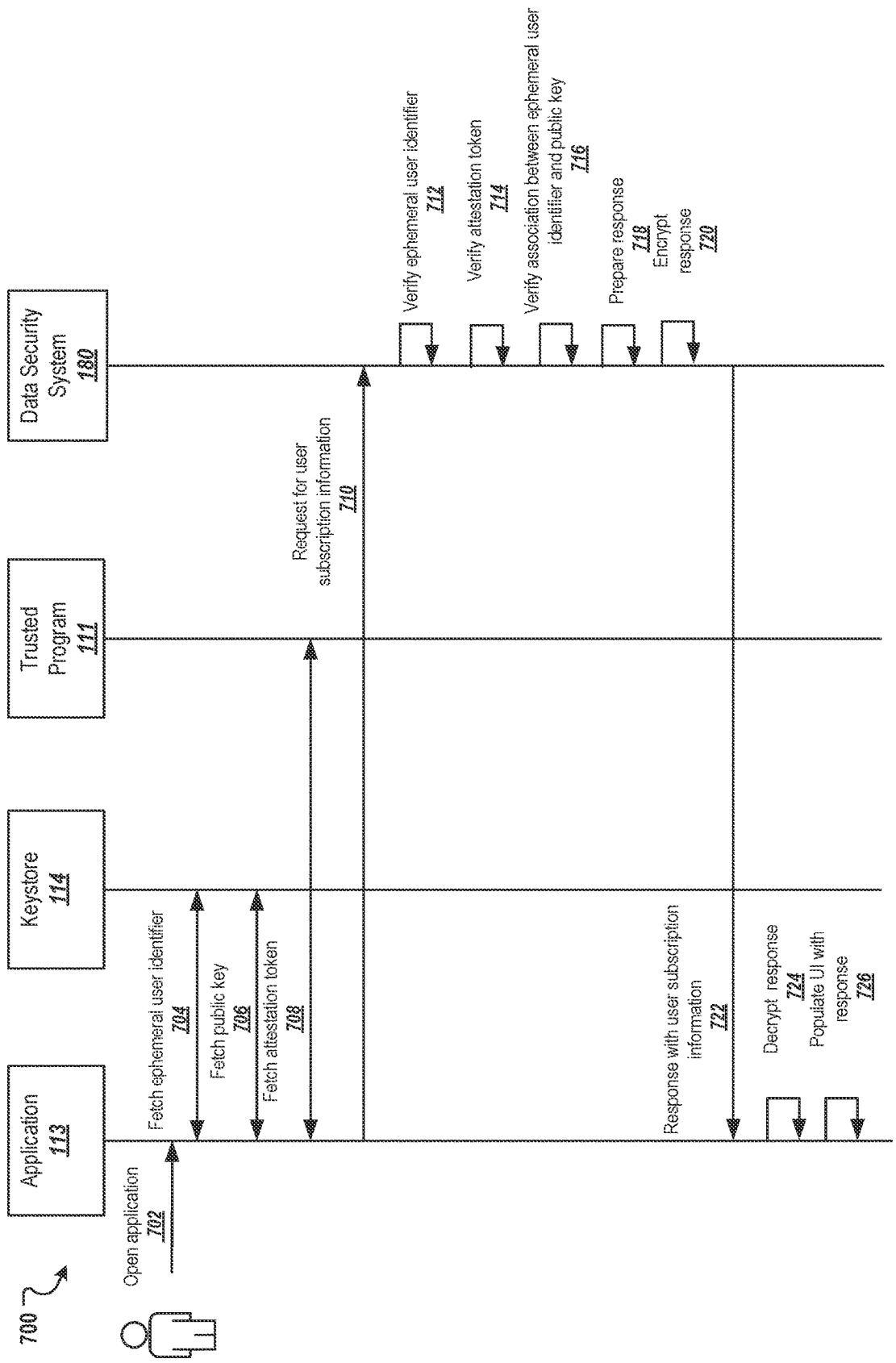
FIG. 7 is a swim lane diagram of an example process for generating and providing a user interface that enables a user to adjust data privacy settings.

FIG. 7 is a swim lane diagram that illustrates an example process 700 for generating and providing a user interface that enables a user to adjust data privacy settings. Operations of the process 700 can be implemented, for example, by a client device 110 or a data security system 180. Operations of the process 700 can be implemented as instructions stored on one or more computer readable media which may be non-transitory, and execution of the instructions by one or more data processing apparatus can cause the one or more data processing apparatus to perform the operations of the process 700.

The user of the client device 110 opens (e.g., launches) the application 113 (702). As mentioned before, the application 113 can be provided by the data security system 180 and installed or otherwise running on the client device 110. The application 113 can receive information from the data security system 180 regarding user subscriptions and privacy settings and provide a user interface to present that information to the user. The application 113 can further include interactive controls that enable the user to select and manage individual subscriptions and privacy settings. To view the subscription and privacy settings, the user opens the application 113 on the client device 110. As this information may be sensitive, additional authentication techniques are used, as described below, to ensure that the client device 110, the application 113, and/or the user are valid and not compromised.

The application 113 executing on the client device fetches the ephemeral user identifier (704). As mentioned before with reference to FIG. 6, the ephemeral user identifier is stored at the client device 110. For example, the application 113 can store the ephemeral user identifier in a keystore 114 of the trusted program 111 of the client device 110 or other secure storage at the client device 110. After initiating the application 113, the application 113 fetches the ephemeral user identifier from the keystore 114 of the trusted program 111 of the client device 110 or other secure storage at the client device 110. For example, the application 113 can generate a request for ephemeral user identifier to the trusted program 111 through one or more application program interface (API) calls and the trusted program 111 provides a response that includes the ephemeral user identifier.

The application 113 fetches a public key (706). In some implementations, the application 113 during installation or during its first execution on the client device 110, creates a public/private key pair for the purpose of securely communicating with the data security system 180. Since the application 113 executing on the client device 110 generates the public/private key pair, the public key that is distributed to other recipient entities, can be used as a unique identifier for the client device 110. In general, the public/private key pair can be used for asymmetric encryption for communication between two parties over an unverified network. For example, a sender can encrypt a message in plaintext to a ciphertext using the public key that is available to all parties.

The receiver after receiving the message can use the private key to decrypt the ciphertext to obtain the message in plaintext. The private key is a secret key and is known only to the receiver (e.g., the data security system 180). The application 113 after creating the public/private key pair, stores the private key securely in the keystore 114 of the trusted program 111 of the client device 110 or other secure storage at the client device 110. When the user initiates the application 113, the application 113 fetches the public key of the client device 110, which can be stored in an unsecured data storage location of the client device 110.

The application 113 fetches an attestation token from the trusted program of the client device 110 (708). In general, the client device can generate communications, e.g., electronic messages or requests that include an attestation token that can be used by recipients of the communication to verify the integrity of the communication. The attestation token can include a payload and a digital signature that is generated based on the set of data using a private key. In this way, the recipient can verify that the payload has not been modified, e.g., during transmission or by an intermediary, by verifying the digital signature using the received set of data and a public key corresponding to the private key used to generate the digital signature. If the trusted program 11 supports attestation, the trusted program 111 can generate the public/private key pair for the attestation token. If not, the application 113 can generate the public/private key pair of the attestation token.

The payload data can include a token creation time that indicates a time at which the attestation token is created, the payload data, and/or one or more integrity tokens provided by one or more integrity systems. This token creation time can be a high resolution timestamp (e.g., accurate to the second, to the millisecond, or to the microsecond). This timestamp enables a recipient of the attestation token to ensure that the attestation is not old, e.g., by determining that the token creation time is within a threshold duration of a time at which the attestation token was received.

The one or more integrity tokens of the attestation token indicate whether the client device 110 transmitting the attestation token and/or the application 113 running on the client device 110 that initiated the transmission is trustworthy. For example, the integrity token can include a verdict of trustworthiness for the client device 110 or the application 113. This enables the recipient (data security system 180) of the attestation token to verify that the data came from a trusted client device 110 and a trusted application 113, e.g., rather than from an emulator or a compromised device, or a compromised application 113. The integrity token can be generated and digitally signed by a trusted analyzer (e.g., a third-party analyzer) so that recipient of the attestation token can verify that the client device 110 was evaluated by a trusted analyzer and that the data in the integrity token was not modified after creation by the trusted analyzer.

The application 113 submits a request to the trusted program 111 executing on the client device 110, to generate an attestation token that includes the ephemeral user identifier (which is an encrypted result from encrypting a user identifier for the user as described above) and the public key of the client device 110 as payload data using one or more API calls to the trusted program 111. That is, the ephemeral user identifier and the public key of the client device 110 can be included in the payload data of the attestation token. The trusted program 111 generates the attestation token and provides the attestation token to the application 113. The attestation token can include the payload data, the one or more integrity tokens and a digital signature of the payload data, the integrity tokens and other data included in the attestation token, e.g., token creation timestamp and ephemeral user identifier. In some implementations, the trusted program 111 uses an Elliptic Curve Digital Signature Algorithm (ECDSA) to generate the digital signature, but other signature techniques (e.g., RSA) can also be used.

The application 113 generates a request for user subscription information (710). The application 113 after fetching the ephemeral user identifier, the public key and the attestation token, generates and transmits a request for user subscription information to the data security system 180. The request includes the attestation token, which can include the ephemeral user identifier and the public key as payload data. In some implementations, the ephemeral user identifier, the public key and the attestation token are encrypted using the public key of the data security system 180, e.g., by encrypting the attestation token that includes the ephemeral user identifier and the public key. As described above, the attestation token can include a digital signature of the other data of the attestation token, e.g., the ephemeral user identifier, the public key, the token creation timestamp, and any integrity tokens. The request for user subscription data can be transmitted, for example, over a packetized network 105, and the content requests themselves can be formatted as packetized data having a header and payload data. The header can specify a destination of the packet and the payload data can include any of the information discussed above.

The data security system 180 validates the ephemeral user identifier (712). After receiving the request for user subscription information, the data security system 180 can validate the ephemeral user identifier by attempting to decrypt the ephemeral user identifier using the secret key that is known only by the data security system 180. If the data security system 180 is able to successfully decrypt the ephemeral user identifier, the data security system 180 can determine that the ephemeral user identifier has been verified successfully. If not, the data security system 180 can determine that the ephemeral user identifier is not verified.

The data security system 180 validates the attestation token (714). The data security system 180, in order to verify that the payload data has not been tampered with and that the sender of the request for user subscription information is the application 113, validates the attestation token that was included within the request for user subscription information. For example, the data security system 180 can verify the attestation token using the token creation time (e.g., by ensuring that the token creation time is within a threshold duration of a current time), the digital signature (using the public key of the attestation token), and/or the integrity token(s) included in the attestation token. Verification of each integrity token can be similar to the way in which the attestation token is verified (e.g., based on a digital signature of the integrity token and a token creation timestamp of the integrity token). In some implementations, all three verifications are performed but fewer verifications can be performed in other implementations. In addition, the verifications can be performed in different orders or in parallel.

The data security system 180 verifies the association between the ephemeral user identifier and the public key (716) of the public/private key pair generated by the application 113 for the purpose of securely communicating with the data security system 180. The data security system 180 after verifying the ephemeral user identifier, can authenticate the client device 110 to prevent any possible impersonation. For example, the data security system 180 can lookup historical records of the phone number of the client device 110 and its association with the public key of the attestation token to verify whether the client device 110 has been associated with, e.g., linked to, the public key in the past. For example, the data security system 180 can maintain a log that, for each successfully verified attestation token, links the public key of the attestation token to the ephemeral user identifier of the attestation token. If so, the current public key was linked to the ephemeral user identifier previously, as reflected in the log, the data security system 180 can determine that the ephemeral user identifier is verified successfully.

If not, the data security system 180 can send a SMS message to the client device 110 with a code that the user can enter on the application 113, or the application 113 can extract automatically from SMS message, to verify that the request for subscription information was initiated from the client device 110 by the user. In another example, the SMS message can include a URL, which can redirect the user to a website of the data security system 180 to verify the user's authenticity. This provides additional security to ensure that a new public key is associated with the ephemeral user identifier and therefore belongs to the client device 110. The data security system 180 can send this SMS message when any of the verifications fail.

The data security system 180 prepares the response to the request for user subscription token (718). After verifying the authenticity of the application 113 executing on the client device 110, the user of the client device 110 and the request for user subscription information, the data security system 180 generates a response that includes information required by the application 113 for presentation to the user. For example, the data security system 180 can extract data from a secured and encrypted database of users that is maintained by the data security system 180.

The data security system 180 encrypts the response before transmitting the application 113 (720). The data security system 180 encrypts the user subscription information into ciphertext using the public key of the public/private key pair of application 113, or the public key of the client device 110 as embedded in attestation tokens, so that only the application 113 executing on the client device 110 can decrypt the ciphertext using the private key and access the user subscription information in plaintext.

The data security system 180 transmits the user subscription information to the application 110 (722). For example, the encrypted user information is transmitted from the data security system 180 to the application 113 executing on the client device 110 for presentation to the user over the packetized network 105, and the content themselves can be formatted as packetized data having a header and payload data. The header can specify a destination of the packet and the payload data can include any of the information discussed above. The user subscription information can include the user's data privacy settings, which can include a list of the publishers that have requested subscription tokens for the user, e.g., in response to the user subscribing to the publisher.

The application 113 executing on the client device 110 after receiving the response with encrypted user subscription data, decrypts the data into plaintext using the private key (724) and presents the plaintext user subscription data (726) to the user of the client device 110.

As mentioned before, the application 113 can further include interactive controls for the users to select and manage individual subscriptions and privacy settings. This is explained before with reference to FIG. 8.

Figure 8:
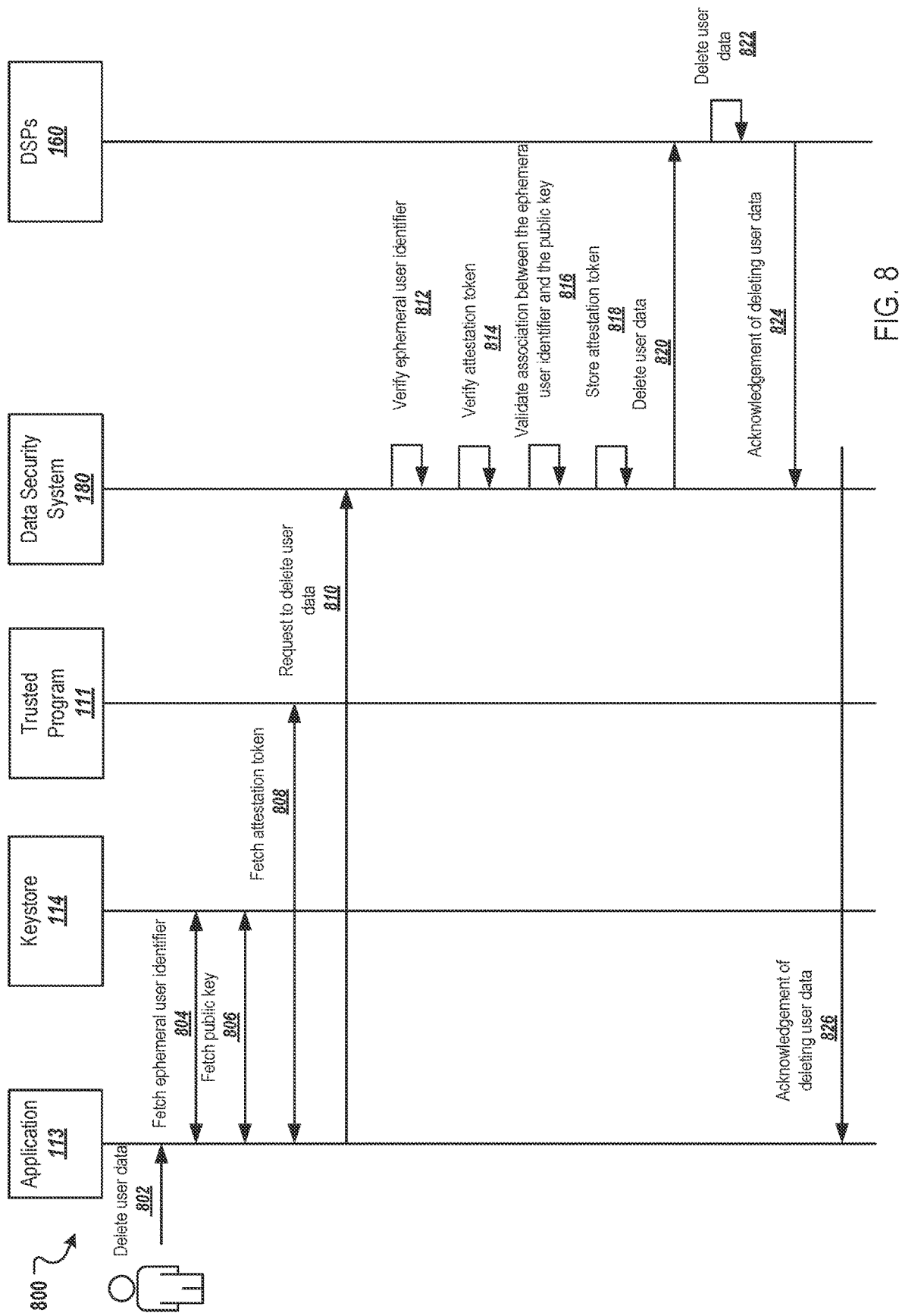
FIG. 8 is a swim lane diagram of an example process for deleting user data using an application provided by the data security system.

FIG. 8 is a swim lane diagram that illustrates an example process 800 modifying data privacy settings. Operations of the process 800 can be implemented, for example, by a client device 110, content platforms, and a data security system 180. Operations of the process 800 can be implemented as instructions stored on one or more computer readable media which may be non-transitory, and execution of the instructions by one or more data processing apparatus can cause the one or more data processing apparatus to perform the operations of the process 800. For the purpose of explanation, the process 800 will be described with reference to an example scenario where the user of the client device interacts with the application 113 to select one or more content platforms and provides instructions via the user interface of the application 112 to delete user data from selected one or more content platforms.

The user of the client device 110 interacts with the application 113 to delete user data from one or more content platforms (802). As mentioned before, the application 113 is provided by the data security system 180 and installed or otherwise running on the client device 110. The application 113 can receive information from the data security system 180 regarding user subscriptions, including data privacy settings, and provides a user interface to present that information to the user. The application 113 can further include interactive controls for the users to select and modify individual subscriptions and privacy settings. For example, the user opens the application 113 on the client device 110, views current subscription and privacy settings via the example process 700 and through the user interface, provides instructions to delete user data from the selected one or more content platforms. Although this example is in terms of deleting user data at a DSP, a similar process can be used to perform other modifications, e.g., how the user's data is used by the DSP. Thus, more generally, the requests to delete user data (810) and (820) may be requests to modify a data privacy setting for one or more entities (e.g. the content platforms), the deletion of user data (822) may be the modification of the data privacy setting and the acknowledgment (824) may be an acknowledgment of modifying the data privacy setting.

The application 113 executing on the client device fetches the ephemeral user identifier (804). As mentioned before with reference to FIG. 6 the ephemeral user identifier is stored at the client device 110. For example, the client device 110 after receiving the ephemeral user identifier, can store the identifier securely in the keystore 114 of trusted program 111 of the client device 110. After initiating the application 113, the application 113 fetches the ephemeral user identifier from the trusted program 111 of the client device 110. For example, the application 113 can generate a request for an ephemeral user identifier and the trusted program 111 provides a response to the request that includes the ephemeral user identifier. As described above, the ephemeral user identifier is an encrypted result generated by encrypting a user identifier (e.g., phone number, e-mail address or internal identifier) for the user.

The application 113 fetches a public key (806). As described above, the application 113 during installation or during its first execution on the client device 110, creates a public/private key pair for the purpose of securely communicating with the data security system 180. The application 113 after creating the public/private key pair, stores the private key securely in the keystore 114 of the trusted program 111 of the client device 110 or other secure storage at the client device 110. When the user initiates the application 113, the application 113 fetches the public key of the client device 110, e.g., from another unsecured data storage location of the client device 110.

The application 113 fetches an attestation token from the trusted program 111 of the client device 110 (808). Similar to the step 708 of the process 700, the application 113 submits a request to the trusted program 111 executing within the client device 110, to generate an attestation token that includes the ephemeral user identifier and the public key of the application 113 as payload data using one or more API calls to the trusted program 111. The trusted program 111 generates the attestation token and provides the attestation token to the application 113. The attestation token can include the payload data and a digital signature of the payload data. In some implementations, the trusted program 111 uses an Elliptic Curve Digital Signature Algorithm (ECDSA) to generate the digital signature, but other signature techniques (e.g., RSA) can also be used.

The application 113 generates a request to delete user data (810). The application 113 after fetching the ephemeral user identifier, the public key and the attestation token, generates and transmits a request to delete user data to the data security system 180. The request includes the ephemeral user identifier, the public key and the attestation token. The request to delete user data can also include the list of the selected one or more content platforms or DSPs 160 to delete user data chosen by the user via the user interface. The request to delete user data can be transmitted, for example, over a packetized network 105, and the content requests themselves can be formatted as packetized data having a header and payload data. The header can specify a destination of the packet and the payload data can include any of the information discussed above.

The data security system 180 validates the ephemeral user identifier (812). After receiving the request to delete user data, the data security system 180 can validate the ephemeral user identifier in the same manner as described above with reference to FIG. 7.

The data security system 180 validates the attestation token (814). For example, the data security system 180 can verify the attestation token using the token creation time, the digital signature, and/or the integrity token(s) included in the attestation token, as described above with reference to FIG. 7.

The data security system 180 verifies the association between the ephemeral user identifier and the public key (816). For example, as described above with reference to FIG. 7, the data security system 180 can lookup historical records of the phone number of the client device 110 and its association with the public key of the attestation token to verify whether the client device 110 is in fact associated to the public key. In another example, the data security system 180 can send a SMS message to the client device 110 with a code that the user can enter on the application 113, or the application 113 can read SMS messages to extract the code, to verify that the request for subscription information was initiated from the client device 110 by the user. In another example, the SMS message can include a URL, which can redirect the user to a website of the data security system 180 to verify the user's authenticity.

The data security system 180 stores the attestation token (818). The data security system can maintain a log for each request to modify user subscription/privacy settings received from the client device 110. For example, the data security system 180 can store the attestation token that was included in the request to delete user data so as to be able to perform an audit to check whether all entities associated to the user of the client device 110 and the data security system 180 are following the protocols set by the user and the data security system 180. In some implementations, the data security system 180 can remove the attachment elements of the attestation token to conserve storage space in the data security system 180.

The data security system 180 transmits requests to delete user data to the content platform(s) that the user requested to delete the data (820). For example, after authenticating the request to delete user data and the client device 110, the data security system 180 can transmit a request to delete user data to each of the selected one or more content platforms that are associated with the data security system 180. If the request is to modify a data privacy setting, the request can specify the requested modification instead.

The content platform(s) delete user data (822). In response to receiving the request to delete user data transmitted by the data security system 180, the selected one or more content platforms delete the user data of the user identified by the second user identifier included in the request to delete user data. The content platform(s) can store the attestation token along with data describing the event, e.g., the data deletion event. If the event is to modify data privacy settings, e.g., giving a content platform permission to use the user's data, the attestation token can be used as cryptographically verifiable proof that the content platform was permitted to use the user's data.

The data security system 180 receives acknowledgment from the content platforms (824). In response to deleting user data by each of the selected one or more content platforms, each of the selected one or more content platforms transmit an acknowledgment notification the data security system 180 over the network 105. The data security system 180 in return transmits an acknowledgment to the application 113 of the client device 105 (826) to notify the user that the user's request has been processed. In some implementations, the application 113 may directly transmit the user data deletion request to one or more DSPs 160.

In some implementations, when the user of the client device 110 does not have access to the application 113 (e.g., when the application 113 is not installed on the client device 110), the user can use the browser based application 112 to access a website provided by the data security system 180 and perform all of the above mentioned tasks. This scenario is further explained with reference to FIG. 9.

Figure 9:
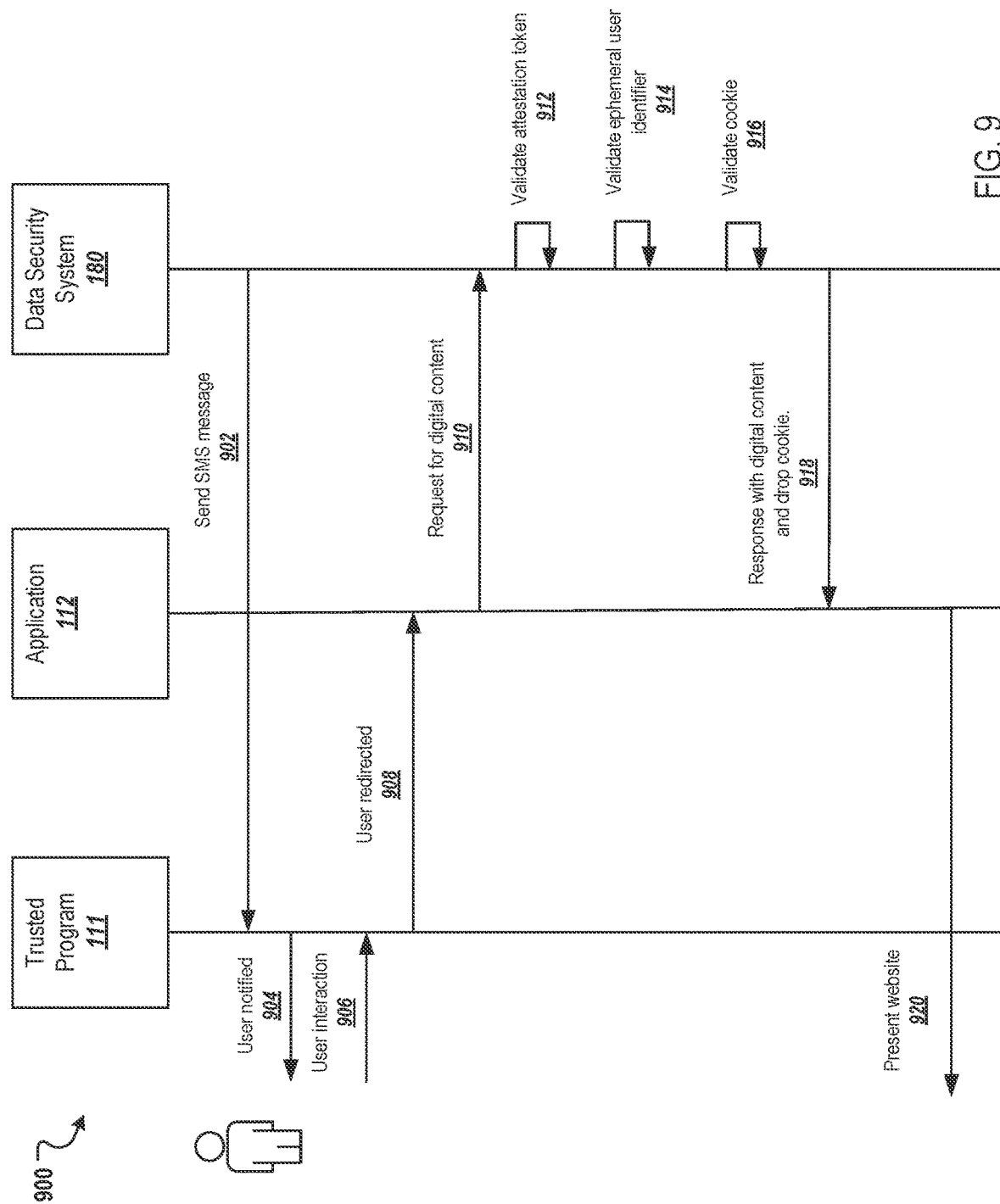
FIG. 9 is a swim lane diagram of an example process for accessing a web-based user interface of the data security system.

FIG. 9 is a swim lane diagram that illustrates an example process 900 for generating and providing a user interface that enables a user to adjust data privacy settings using a browser application. Operations of the process 900 can be implemented, for example, by the client device 110 or the data security system 180. Operations of the process 900 can be implemented as instructions stored on one or more computer readable media which may be non-transitory, and execution of the instructions by one or more data processing apparatus can cause the one or more data processing apparatus to perform the operations of the process 900.

The data security system 180 sends a SMS message to the client device 110 (902). For example, assume that the user of the client device 110 uses a browser application 112 to navigate to a website 142 of a publisher 140. Further assume, that the user provides the user's phone number for subscribing to the publisher 140. In such a scenario, the publisher 140 will notify the data security system 180 which in turn will send a SMS message to the client device 110 to which the phone number belongs. In some implementations, the SMS message sent to the user's client device 110 by the data security system 180 includes a resource locator such as a URL to the dashboard or the website of the data security platform 180 and an encrypted ephemeral user identifier for the user. The ephemeral user identifier for the user is generated by the data security system 180 by encrypting the user's phone number using a probabilistic symmetric key encryption algorithm and a secret key known only to the data security system 180.

The user of the client device is notified about the SMS message (904) and the user interacts with the SMS message (906). For example, after receiving the SMS message from the data security system 180, the user is notified about the SMS message. The user after getting notified by the trusted program 111 (e.g., operating system) of the client device 110 about the SMS message, interacts with the URL provided in the SMS message and gets redirected to a website provided by the data security system 180 using the browser application 112 (908).

The browser application 112 generates and transmits a request for digital content (910). For example, after the user of client device 110 specifies a website by clicking a reference (e.g., URL) in the SMS message, the application 112, e.g., the web browser running on the client device 110 generates a request for digital content (i.e. the request for the website of the data security system 180) and transmits it over the network 105 to the data security system. In some implementations, the request for digital content may include an attestation. In this example, the attestation token can be in the form of a trust token issued by a trusted third party. For example, the trusted third party can issue trust tokens to the client device 110 after evaluating fraud detection signals obtained from the client device 110. In some implementations, the request for digital components can include a cookie of the data security system 180 that was placed on the client device 110 during a prior communication with the data security system 180.

The data security system 180 validates attestation records of the trust token (912). The attestation records can include a signed redemption record. For example, a script or other code on the webpage can request the browser to redeem a trust token from the trusted third party. If the trust token is valid, the trusted third party can return a signed redemption record to the browser. The data security system 180 receives the request for digital content (i.e., the request for the website of the data security system 180) with attestation records attached. The attestation record can include a set of data that includes a token identifier for the trust token, a token creation timestamp, and the signed redemption records. The attestation record can also include a digital signature of the set of data generated using a private key of the trusted third party. The data security system 180 can verify the signed redemption record by verifying that the token creation time is within a threshold duration of a current time and by verifying the digital signature using a public key corresponding to the private key of the trusted third party.

The data security system 180 validates the ephemeral user identifier (914). The data security system 180 decrypts the encrypted ephemeral user identifier, the public key and the attestation token using the private key of the data security system 180. The data security system 180 further validates the ephemeral user identifier, the public key and the attestation token using the digital signature that was included in the request for digital content using the public key of the client device 110 or the application 113. If any piece of the data of the request for digital content changes after the digital signature is generated, the verification of the digital signature will fail.

The data security system 180 validates the cookie received with the request for digital component (916). For example, assume that the data security system 180 had placed a cookie in the browser application 112 during a prior access of the website of the data security system by the application 112. Also assume that the cookie value is the ephemeral user identifier (which is an encrypted result as described above). The data security system 180 after receiving the cookie that was included in the request for digital component, validates the cookie for any signs of impersonation.

The data security system 180 transmits digital content to the browser application 112 (918). For example, the data security system 180 can respond by transmitting computer-executable instructions and data of the website to the browser application 112 executing on the client device 110. The response can include data related to the website that is transmitted, for example, over a packetized network 105, and the content themselves can be formatted as packetized data. In some implementations, the response with digital content can also include a cookie to be placed in the cookie jar of the browser application 112 to identify the browser application 112 during any future communication with the data security system 180. The browser application 112 after receiving the content of the website presents the website to the user (920).

Figure 10:
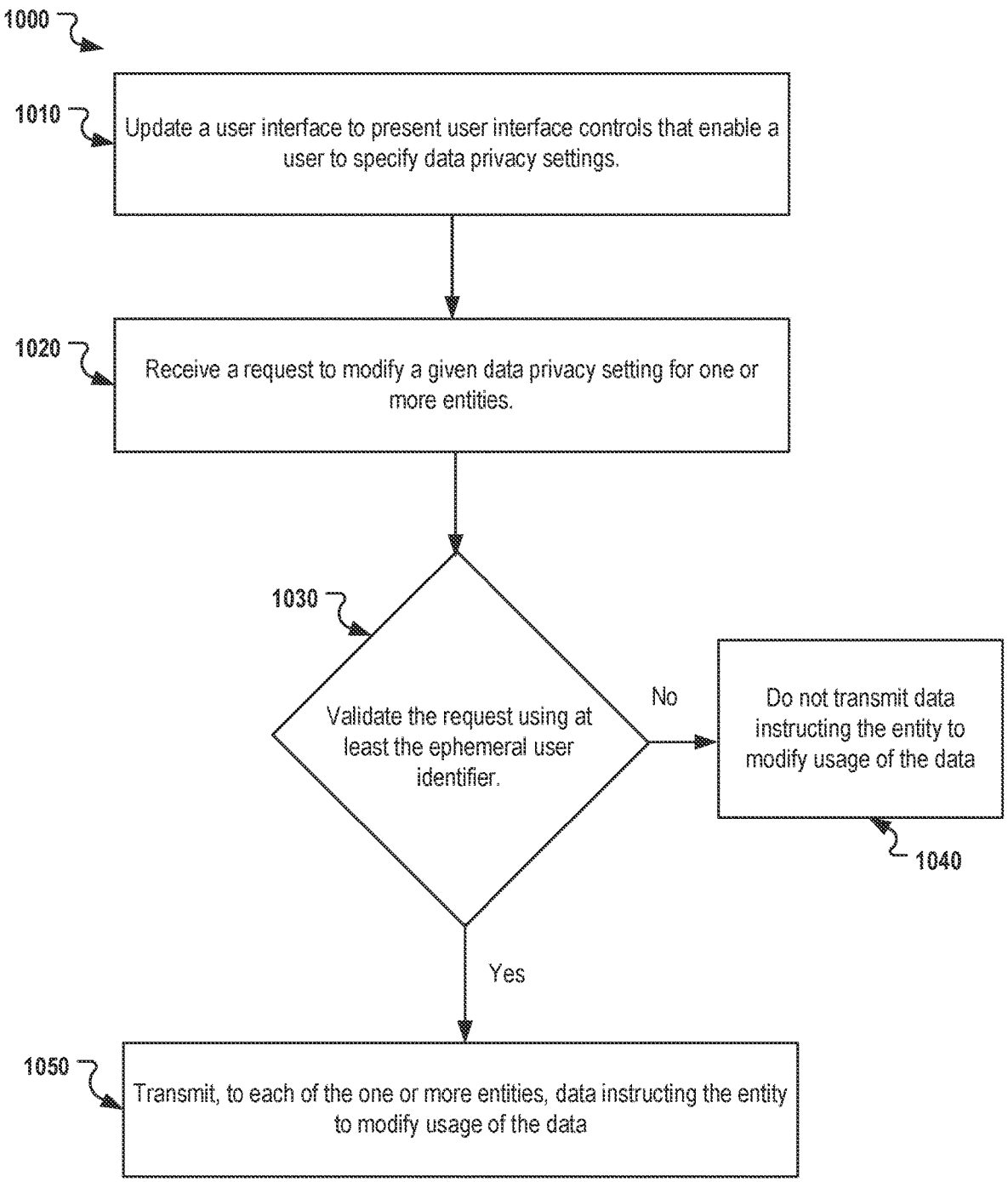
FIG. 10 is a flow diagram of an example process for modifying usage of the user data based on the modified data privacy setting using the user interface controls.

FIG. 10 is a flow diagram illustrating the process 1000 of modifying usage of the user data based on the modified data privacy setting using the user interface controls. Operations of the process 1000 can be implemented, for example, by a client device 110 and/or a data security system 180. Operations of the process 1000 can also be implemented as instructions stored on one or more computer readable media which may be non-transitory, and execution of the instructions by one or more data processing apparatus can cause the one or more data processing apparatus to perform the operations of the process 1000.

The user interface is updated to present user interface controls that enable the user to specify data privacy settings (1010). For example, the application 113 accesses user subscription data from the data security system 180. Upon accessing the user subscription data, the application 113 presents the user subscription data to the user and provides interface controls for the user. The user interacts with the interface controls to delete user data from one or more content platforms, or modify a given data privacy setting for one or more entities.

A request to modify a given data privacy setting for one or more entities is received (1020). For example, after the user selects one or more content platforms, the application 113 fetches the ephemeral user identifier, the public key, and the attestation token from the client device 110. The application then generates and transmits a request to update or modify data privacy settings of the user to the data security system 180.

The data security system 180 attempts to validate the request using at least the ephemeral user identifier (1030). For example, after receiving the request to modify the data privacy settings, the data security system 180 validates the request by verifying the ephemeral user identifier, the attestation token (which can be in the form of an attestation record with a signed redemption record), and/or the association between the ephemeral user identifier and the public key, as described above with reference to FIGS. 7 and 8.

If the request is validated successfully, the data security system 180 transmits data instructing each of the one or more entities affected by the modified data privacy settings to modify usage of the data in accordance with the modified data privacy settings (1050). For example, after validating the request to modify the data privacy settings from the client device 110, the data security system 180 can transmit, to each affected entity, a request to modify collection, storage, and/or usage of the user's data based on the modified data privacy settings for that entity. This request can include the ephemeral user identifier for the user.

If the request is not validated successfully, the data security system 180 does not transmit data instructing each of the one or more entities to modify usage of the data (1040). For example, if any of the verifications fail, the data security system 180 does not transmit a request to modify the usage of the user's data to the affected entities.

Figure 11:
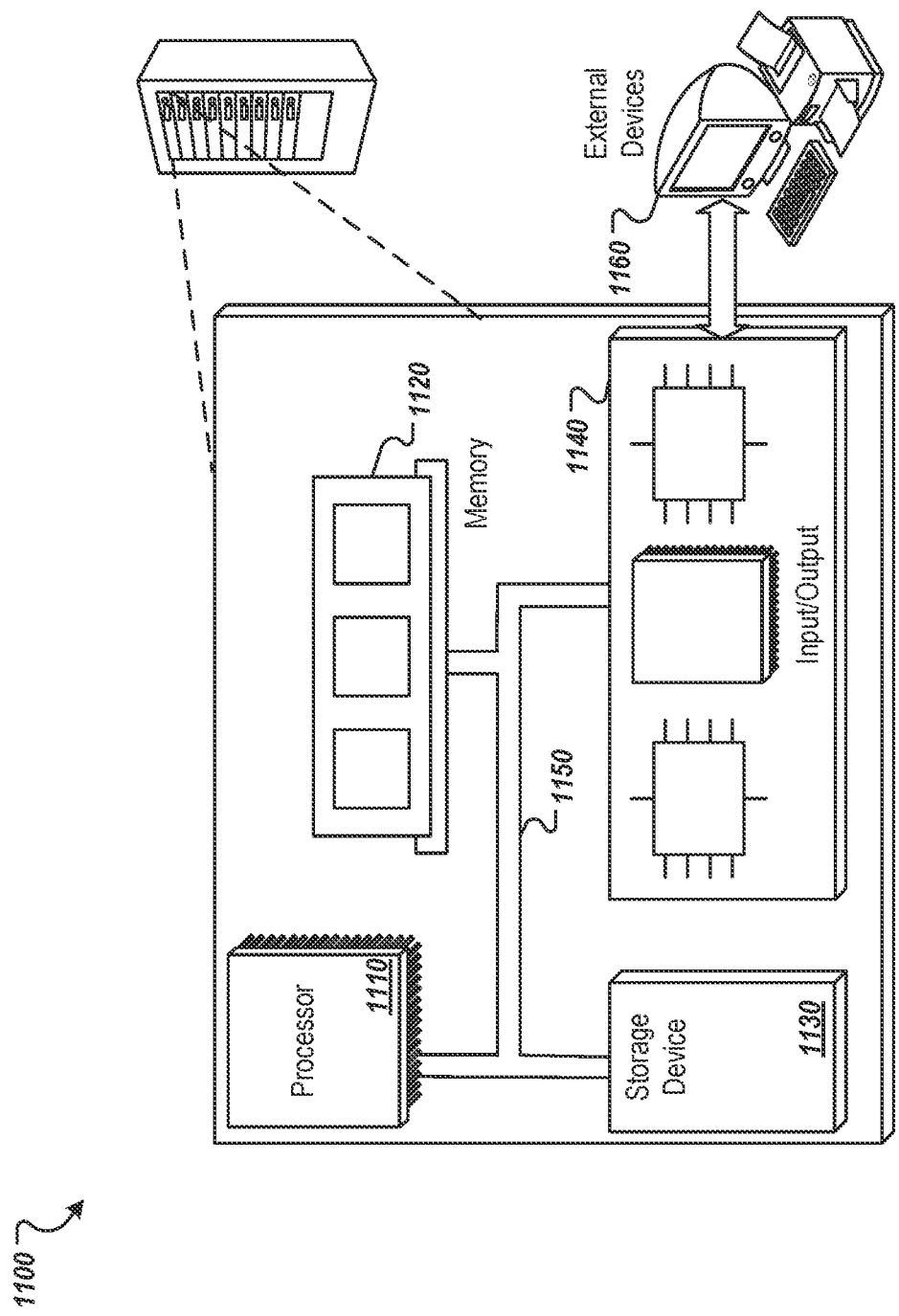
FIG. 11 is a block diagram of an example computer system.

FIG. 11 is a block diagram of an example computer system 1100 that can be used to perform operations described above. The system 1100 includes a processor 1110, a memory 1120, a storage device 1130, and an input/output device 1140. Each of the components 1110, 1120, 1130, and 1140 can be interconnected, for example, using a system bus 1150. The processor 1110 is capable of processing instructions for execution within the system 1100. In some implementations, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In one implementation, the memory 1120 is a computer-readable medium. In some implementations, the memory 1120 is a volatile memory unit. In another implementation, the memory 1120 is a non-volatile memory unit.

The storage device 1130 is capable of providing mass storage for the system 500. In some implementations, the storage device 1130 is a computer-readable medium. In various different implementations, the storage device 1130 can include, for example, a hard disk device, an optical disk device, a storage device that is shared over a network by multiple computing devices (e.g., a cloud storage device), or some other large capacity storage device.

The input/output device 1140 provides input/output operations for the system 1100. In some implementations, the input/output device 1140 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1160, e.g., keyboard, printer and display devices. Other implementations, however, can also be used, such as mobile computing devices, mobile communication devices, set-top box television client devices, etc.

Although an example processing system has been described in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a data security system and from a publisher computing system of a publisher, a request for a subscription token for a given user, the request comprising user identification information provided to the publisher by the given user when subscribing to electronic content of the publisher;
   generating, by the data security system, the subscription token for the publisher and the given user, wherein the subscription token comprises (i) a set of data comprising a first encrypted user identifier that encrypts a first user identifier for the given user with an encryption key of the data security system, wherein the first user identifier is used by the data security system to identify the given user, and (ii) for each of one or more content platforms, a respective attachment element comprising a respective second encrypted user identifier that encrypts a second user identifier for the given user with a respective encryption key of the respective content platform, wherein the second user identifier is used by the respective content platform to identify the given user; and transmitting the subscription token to the publisher computing system.

2. The computer-implemented method of claim 1, wherein the data security system comprises a computing system of an e-mail provider and the user identification information comprises an e-mail address of the given user and for an e-mail account of the given user with the e-mail provider.

3. The computer-implemented method of claim 2, wherein the first user identifier for the given user comprises one of (i) the e-mail address of the given user for the e-mail account of the given user with the e-mail provider or (ii) another user identifier corresponding to the e-mail address of the given user.

4. The computer-implemented method of claim 1, wherein the user identification information comprises a phone number of the given user.

5. The computer-implemented method of claim 1, wherein the attachment element for each content platform comprises a digital signature of the set of data and the second encrypted user identifier of the attachment element, wherein the digital signature is generated using a private key of the data security system.

6. The computer-implemented method of claim 1, wherein the subscription token comprises a digital signature of the set of data and each attachment element.

7. The computer-implemented method of claim 1, further comprising:
receiving, from the publisher computing system, recurring renewal requests that are each for a renewed subscription token for the given user, each renewal request comprising a respective first encrypted user identifier of a previous request;
for each renewal request:
generating an updated first encrypted user identifier different from the first encrypted user identifier of the previous request;
generating the renewed subscription token comprising an updated set of data comprising the updated first encrypted user identifier and each attachment element; and
transmitting the renewed subscription token to the publisher computing system.

8. The computer-implemented method of claim 7, wherein the renewed subscription token further comprises updated data privacy settings that have been updated by the given user since the subscription token was generated.

9. The computer-implemented method of claim 1, wherein generating the subscription token for the publisher and the given user comprises identifying, as the one or more content platforms, each content platform designated as being an eligible content platform by the publisher and the given user, each eligible content platform being a content platform that is eligible to select digital components for presentation to the given user with electronic resources of the publisher.

10. The computer-implemented method of claim 1, wherein generating the subscription token for the publisher and the given user comprises identifying, as the one or more content platforms, each content platform designated as being an eligible content platform by the publisher and the given user, each eligible content platform being a content platform that is eligible to collect, store, and use data of the given user.

11. The computer-implemented method of claim 1, further comprising providing, to a client device of the given user, an interactive user interface that enables the given user to manage use of data of the given user by a set of publishers and a set of content platforms.

12. The computer-implemented method of claim 11, wherein the interactive user interface includes data identifying content platforms that partner with the publisher to select digital components for presentation with content of the publisher and enables the given user to select the one or more content platforms that are eligible to obtain and store data of the given user, select the one or more publishers that are eligible to obtain and store data for the given user, select, for each content platform and each publisher, one or more ways in which the data of the given user is eligible to be used, and request that the one or more content platforms or the one or more publishers to delete the data for the given user.

13. The computer-implemented method of claim 12, further comprising:
detecting, based on data received from the client device of the given user, that the given user has designated the publisher as being ineligible to obtain and store data for the given user;
receiving, from the publisher computing system, a request for a renewed subscription token for the given user; and
determining to not provide the renewed subscription token for the given user to the publisher computing system in response to detecting that the given user has designated the publisher as being ineligible to obtain and store data of the user.

14. The computer-implemented method of claim 12, further comprising:
detecting, based on data received from the client device of the given user, that the given user has designated a given content platform as being ineligible to obtain and store data for the given user;
receiving, from the publisher computing system, a request for a renewed subscription token for the given user; and
determining to not include an attachment element for the given content platform with the renewed subscription token in response to detecting that the given user has designated a given content platform as being ineligible to obtain and store data for the given user.

15. A non-transitory computer-storage medium storing instructions that when executed by one or more processors of a data security system cause the one or more processors to perform operations comprising:
receiving, by a data security system and from a publisher computing system of a publisher, a request for a subscription token for a given user, the request comprising user identification information provided to the publisher by the given user when subscribing to electronic content of the publisher;
generating, by the data security system, the subscription token for the publisher and the given user, wherein the subscription token comprises (i) a set of data comprising a first encrypted user identifier that encrypts a first user identifier for the given user with an encryption key of the data security system, wherein the first user identifier is used by the data security system to identify the given user, and (ii) for each of one or more content platforms, a respective attachment element comprising a respective second encrypted user identifier that encrypts a second user identifier for the given user with a respective encryption key of the respective content platform, wherein the second user identifier is used by the respective content platform to identify the given user; and transmitting the subscription token to the publisher computing system.

16. A data security system comprising:

one or more processors; and one or more storage devices including instructions that, when executed, cause the one or more processors to perform operations comprising:

receiving, by a data security system and from a publisher computing system of a publisher, a request for a subscription token for a given user, the request comprising user identification information provided to the publisher by the given user when subscribing to electronic content of the publisher;

generating, by the data security system, the subscription token for the publisher and the given user, wherein the subscription token comprises (i) a set of data comprising a first encrypted user identifier that encrypts a first user identifier for the given user with an encryption key of the data security system, wherein the first user identifier is used by the data security system to identify the given user, and (ii) for each of one or more content platforms, a respective attachment element comprising a respective second encrypted user identifier that encrypts a second user identifier for the given user with a respective encryption key of the respective content platform, wherein the second user identifier is used by the respective content platform to identify the given user; and transmitting the subscription token to the publisher computing system.

17. The data security system of claim 16, further comprising a computing system of an e-mail provider and the user identification information comprises an e-mail address of the given user and for an e-mail account of the given user with the e-mail provider.

18. The data security system of claim 17, wherein the first user identifier for the given user comprises one of (i) the e-mail address of the given user for the e-mail account of the given user with the e-mail provider or (ii) another user identifier corresponding to the e-mail address of the given user.

19. The data security system of claim 16, wherein the user identification information comprises a phone number of the given user.

20. The data security system of claim 16, wherein the attachment element for each content platform comprises a digital signature of the set of data and the second encrypted user identifier of the attachment element, wherein the digital signature is generated using a private key of the data security system.

* * * * *